US012638849B2

(12) United States Patent
Chen et al.

(10) Patent No.: US 12,638,849 B2
(45) Date of Patent: May 26, 2026

(54) INFORMATION PROCESSING DEVICE, INFORMATION PROCESSING SYSTEM, METHOD, AND PROGRAM

(71) Applicant: Sony Group Corporation, Tokyo (JP)

(72) Inventors: Xi Chen, Tokyo (JP); Hiroshi Miyagawa, Tokyo (JP); Hiroshi Kawashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 169 days.

(21) Appl. No.: 18/248,876

(22) PCT Filed: Sep. 27, 2021

(86) PCT No.: PCT/JP2021/035272
§ 371 (c)(1),
(2) Date: Apr. 13, 2023

(87) PCT Pub. No.: WO2022/085368
PCT Pub. Date: Apr. 28, 2022

(65) Prior Publication Data
US 2023/0400863 A1    Dec. 14, 2023

(30) Foreign Application Priority Data
Oct. 20, 2020    (JP) ................................. 2020-175830

(51) Int. Cl.
*G05D 1/00*        (2024.01)
*G01C 21/34*       (2006.01)

(52) U.S. Cl.
CPC ....... *G05D 1/0246* (2013.01); *G01C 21/3415* (2013.01); *G05D 1/0212* (2013.01)

(58) Field of Classification Search
CPC ............... G05D 1/0246; G05D 1/0212; G05D 2107/60; G05D 2111/17; G05D 1/242;
(Continued)

(56) References Cited

U.S. PATENT DOCUMENTS

| | | | | |
|---|---|---|---|---|
| 2005/0216124 A1* | 9/2005 | Suzuki | ................. | G05D 1/0272 |
| | | | | 700/253 |
| 2008/0009964 A1* | 1/2008 | Bruemmer | ........... | G05D 1/0223 |
| | | | | 700/245 |

(Continued)

FOREIGN PATENT DOCUMENTS

| | | |
|---|---|---|
| JP | 2005-238396 A | 9/2005 |
| JP | 2009020749 A | 1/2009 |

(Continued)

OTHER PUBLICATIONS

International Search Report and Written Opinion mailed on Dec. 7, 2021, received for PCT Application PCT/JP2021/035272, filed on Sep. 27, 2021, 9 pages including English Translation.

*Primary Examiner* — Abby Lin
*Assistant Examiner* — Renee LaRose
(74) *Attorney, Agent, or Firm* — XSENSUS LLP

(57)    ABSTRACT

A tracking target position estimation unit and a tracking target search unit that searches for a tracking target are included. The tracking target search unit calculates one or more search routes connecting a current position of the mobile device and a position where the tracking target can exist, generates a search route list in which the calculated one or more search routes are arranged from the top in order of proximity to a tracking target estimated position, and selects a search route in order from the top of the generated search route list, and moves the mobile device according to the selected search route to search for the tracking target. It is determined whether or not the tracking target has been detected based on an image captured by a camera mounted on the mobile device, and in a case where the tracking target has been detected, tracking processing is resumed.

17 Claims, 21 Drawing Sheets

(58) Field of Classification Search
CPC ........ G05D 1/246; G05D 1/686; G05D 1/243;
G05D 2109/10; G05D 2111/10; G05D
1/0272; G05D 1/0255; G05D 1/027;
G01C 21/3415
See application file for complete search history.

(56) References Cited

U.S. PATENT DOCUMENTS

| | | | |
|---|---|---|---|
| 2018/0181137 A1 | 6/2018 | Choi | |
| 2021/0191405 A1* | 6/2021 | Ma'As | G06N 3/044 |
| 2023/0185317 A1* | 6/2023 | Horiuchi | G05D 1/0246 |
| | | | 700/245 |

FOREIGN PATENT DOCUMENTS

| | | |
|---|---|---|
| JP | 2010-203886 A | 9/2010 |
| JP | 2014149621 A | 8/2014 |
| JP | 2017-068298 A | 4/2017 |

* cited by examiner

FIG. 2

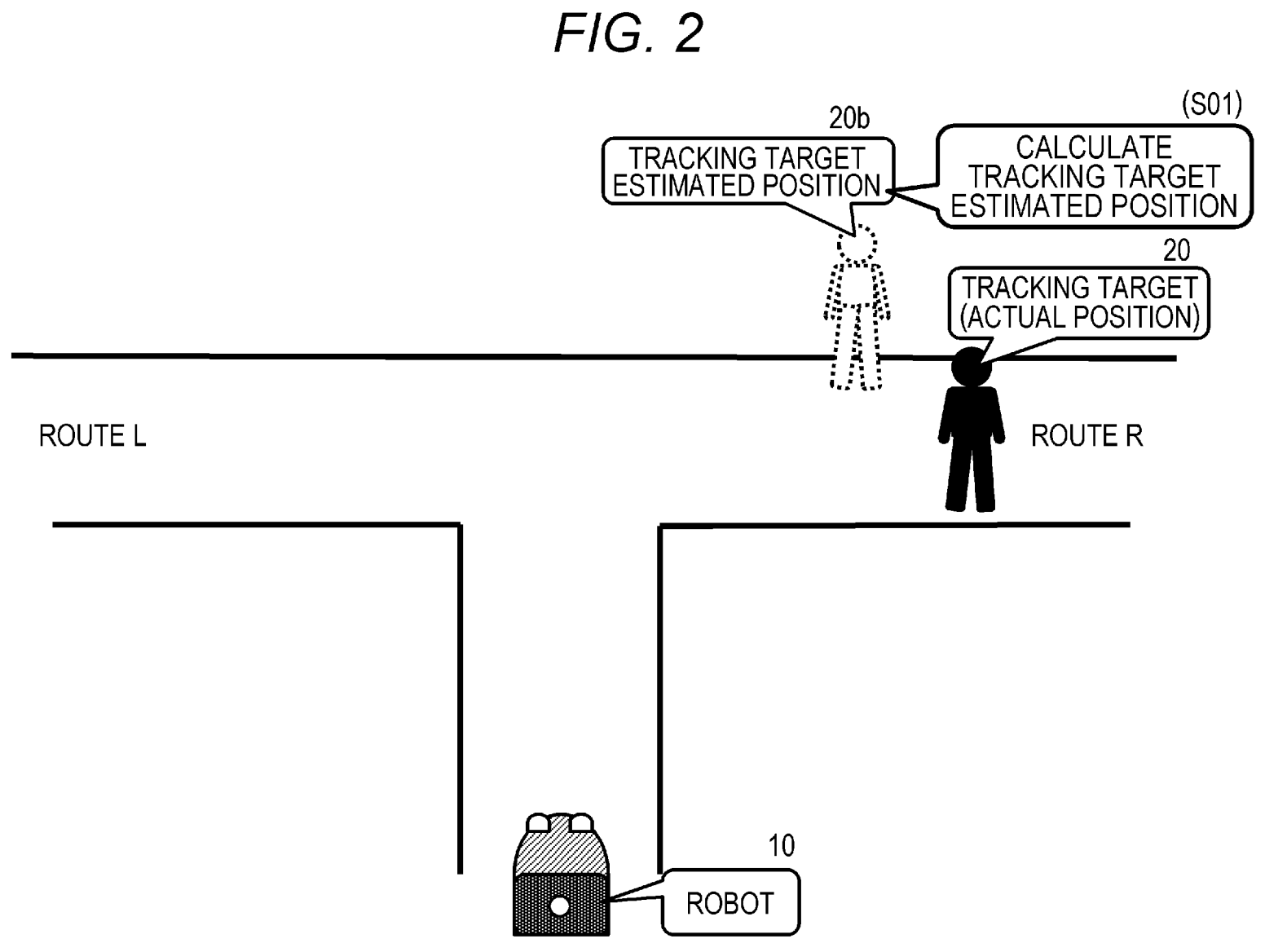

(S01) CALCULATE TRACKING TARGET ESTIMATED POSITION

20 TRACKING TARGET (ACTUAL POSITION)

20b TRACKING TARGET ESTIMATED POSITION

ROUTE R

ROUTE L

10 ROBOT

*FIG. 9*

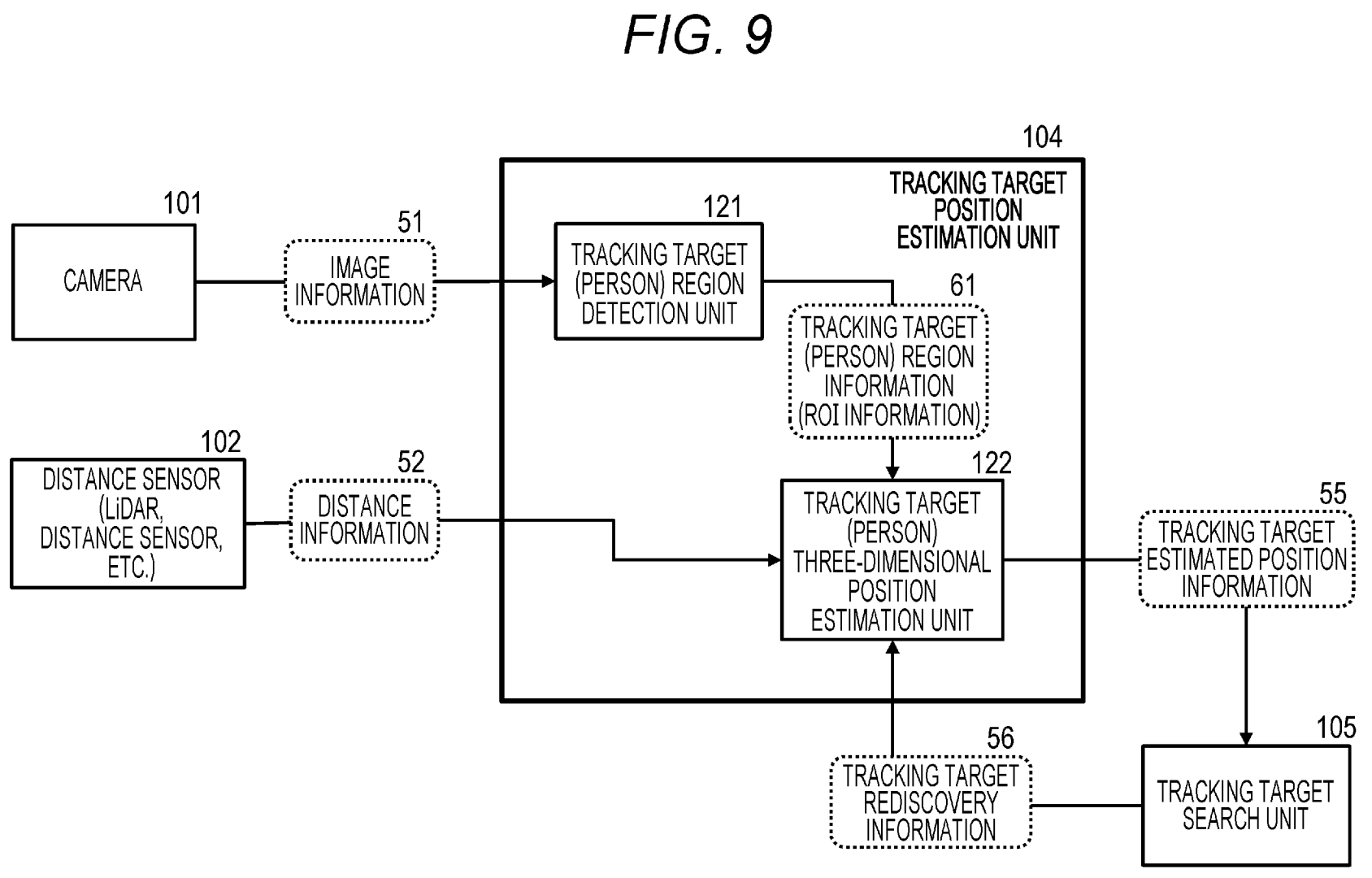

101 CAMERA

51 IMAGE INFORMATION

102 DISTANCE SENSOR (LiDAR, DISTANCE SENSOR, ETC.)

52 DISTANCE INFORMATION

104 TRACKING TARGET POSITION ESTIMATION UNIT

121 TRACKING TARGET (PERSON) REGION DETECTION UNIT

61 TRACKING TARGET (PERSON) REGION INFORMATION (ROI INFORMATION)

122 TRACKING TARGET (PERSON) THREE-DIMENSIONAL POSITION ESTIMATION UNIT

55 TRACKING TARGET ESTIMATED POSITION INFORMATION

105 TRACKING TARGET SEARCH UNIT

56 TRACKING TARGET REDISCOVERY INFORMATION

Figure 12:
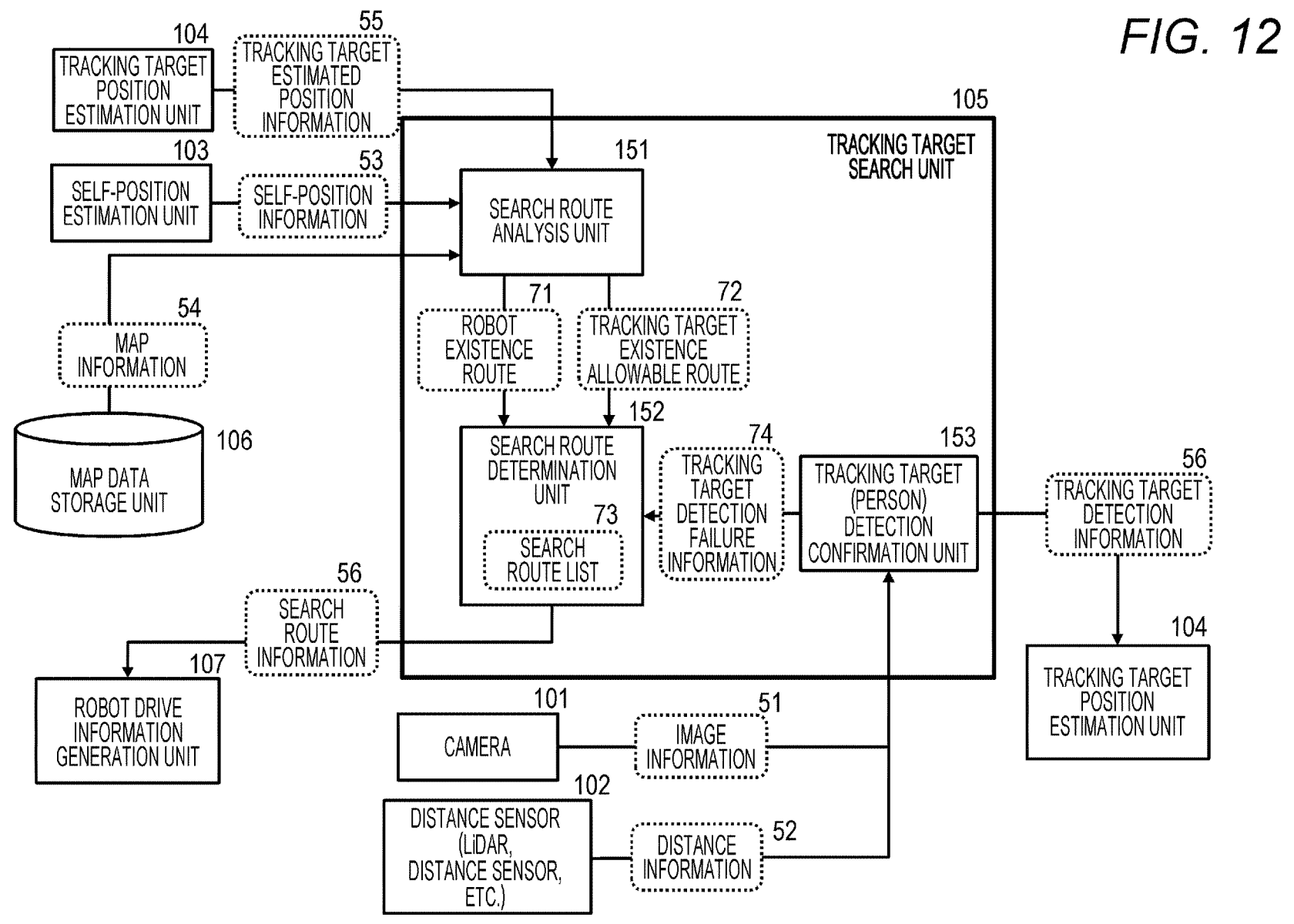

TRACKING TARGET
DETECTION
INFORMATION — 56

TRACKING TARGET
POSITION
ESTIMATION UNIT — 104

TRACKING TARGET SEARCH UNIT — 105

TRACKING TARGET
(PERSON) DETECTION
CONFIRMATION UNIT — 153

TRACKING TARGET
DETECTION
FAILURE
INFORMATION — 74

SEARCH ROUTE
ANALYSIS UNIT — 151

TRACKING TARGET
EXISTENCE
ALLOWABLE ROUTE — 72

ROBOT
EXISTENCE
ROUTE — 71

SEARCH ROUTE
DETERMINATION
UNIT — 152

SEARCH
ROUTE LIST — 73

IMAGE
INFORMATION — 51

DISTANCE
INFORMATION — 52

CAMERA — 101

DISTANCE SENSOR
(LIDAR,
DISTANCE SENSOR,
ETC.) — 102

TRACKING TARGET
ESTIMATED
POSITION
INFORMATION — 55

SELF-POSITION
INFORMATION — 53

SEARCH
ROUTE
INFORMATION — 56

TRACKING TARGET
POSITION
ESTIMATION UNIT — 104

SELF-POSITION
ESTIMATION UNIT — 103

MAP
INFORMATION — 54

MAP DATA
STORAGE UNIT — 106

ROBOT DRIVE
INFORMATION
GENERATION UNIT — 107

Figure 14:
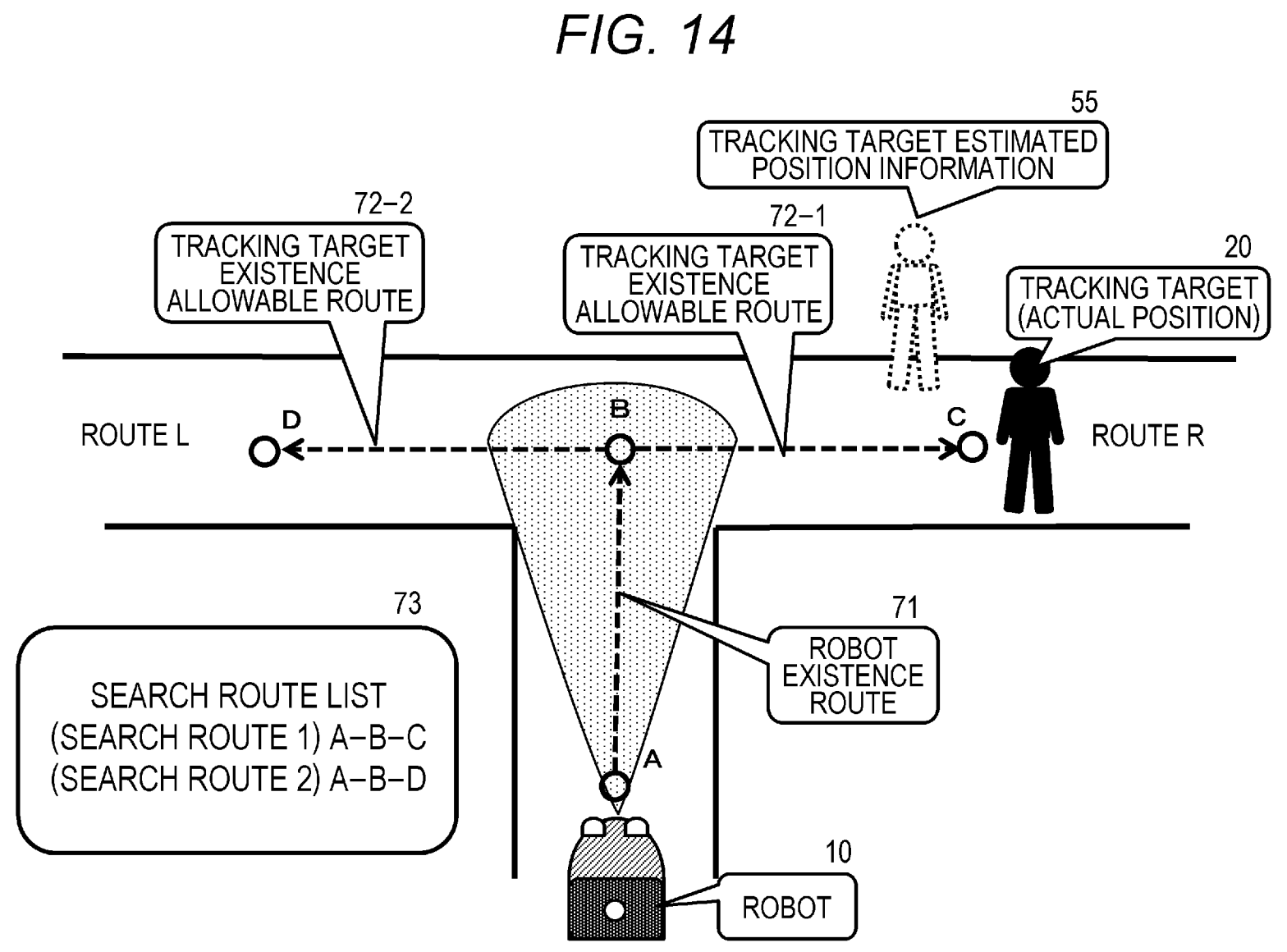

55 TRACKING TARGET ESTIMATED POSITION INFORMATION

20 TRACKING TARGET (ACTUAL POSITION)

ROUTER R 72-1 TRACKING TARGET EXISTENCE ALLOWABLE ROUTE

71 ROBOT EXISTENCE ROUTE

10 ROBOT 72-2 TRACKING TARGET EXISTENCE ALLOWABLE ROUTE

ROUTE L

73 SEARCH ROUTE LIST
(SEARCH ROUTE 1) A-B-C
(SEARCH ROUTE 2) A-B-D

INFORMATION PROCESSING DEVICE, INFORMATION PROCESSING SYSTEM, METHOD, AND PROGRAM

CROSS-REFERENCE TO RELATED APPLICATIONS

The present application is based on PCT filing PCT/JP2021/035272, filed Sep. 27, 2021, which claims priority to Japanese Application No. 2020-175830, filed Oct. 20, 2020, the entire contents of each are incorporated herein by reference.

TECHNICAL FIELD

The present disclosure relates to an information processing device, an information processing system, a method, and a program. More specifically, the present disclosure relates to an information processing device, an information processing system, a method, and a program for generating a movement route when a mobile device such as a robot follows a person, a vehicle, and the like.

BACKGROUND ART

In recent years, use of robots, automated vehicles, and autonomous mobile bodies such as drones and the like has increased.

Some of such autonomous mobile bodies have a configuration in which, for example, another mobile body or a person in front is set as "tracking target", and the autonomous mobile body moves following the tracking target.

Normally, when following a tracking target, a mobile device such as a robot and the like performs processing in which the tracking target is placed in a field of view of a camera and the like of the robot, the tracking target is checked, a movement target position is set at a position of the tracking target or immediately before the position, and a movement route to the set target position is generated to move the robot.

However, if a branch route branching into a plurality of routes exists in a traveling direction of the tracking target, and the tracking target suddenly moves from the branch route to a side path, the tracking target may deviate from the field of view of the robot, the robot cannot recognize the tracking target, and the tracking processing cannot be performed.

In a case where the tracking target deviates from a viewing angle, it is common to estimate a tracking target position and attempt tracking on the basis of an estimation result.

As another method, there is a method of moving to a position where a target is within a field of view assuming that a tracking target exists at a past observation position without performing estimation processing.

However, for example, in a case where the tracking target deviates from the field of view at a branch route, and it is unknown which route of the branch route the tracking target has selected, application of this method becomes difficult.

Note that, for example, Patent Document 1 (Japanese Patent Application Laid-Open No. 2010-203886) discloses a conventional technique that discloses a vehicle traveling control process of traveling while following a leading vehicle.

Patent Document 1 (Japanese Patent Application Laid-Open No. 2010-203886) discloses a configuration in which a positional relationship between the leading vehicle and a following vehicle is controlled with reference to map data and the like so that the leading vehicle always enters a field of view of the following vehicle.

However, in the configuration described in Patent Document 1, for example, in a case where the leading vehicle turns right or left at an intersection, it is necessary that the leading vehicle waits until the following vehicle approaches the leading vehicle and then turns right or left, and there is a problem that processing efficiency decreases.

Furthermore, the configuration described in Patent Document 1 is based on the premise that the leading vehicle and the following vehicle are in a cooperative relationship. In a case where the leading vehicle serving as a tracking target tries to escape from the following vehicle, for example, there is a problem that the configuration described in Patent Document 1 cannot be used.

CITATION LIST

Patent Document

Patent Document 1: Japanese Patent Application Laid-Open No. 2010-203886

SUMMARY OF THE INVENTION

Problems to be Solved by the Invention

The present disclosure has been made in view of the problems described above, for example. Specifically, an object of the present disclosure is to provide an information processing device, an information processing system, a method, and a program capable of efficiently rediscovering a lost tracking target and continuing tracking in a case where the tracking target deviates from a field of view of a robot at an intersection and the like, for example, in a configuration in which tracking is performed while checking the tracking target with a sensor such as a camera and the like of the robot.

Solutions to Problems

A first aspect of the present disclosure is
an information processing device including: a tracking target position estimation unit that calculates a tracking target estimated position that is an estimated position of a tracking target to be tracked by a mobile device; and
a tracking target search unit that searches for the tracking target, in which
the tracking target search unit
calculates one or more search routes connecting a current position of the mobile device and a position where the tracking target can exist,
generates a search route list in which the calculated one or more search routes are arranged from the top in order of proximity to the tracking target estimated position, and
selects a search route in order from the top of the generated search route list, and moves the mobile device according to the selected search route to search for the tracking target.

Moreover, a second aspect of the present disclosure is an information processing system including: a mobile device; and an information processing device capable of communicating with the mobile device, in which the information processing device includes a tracking target position estimation unit that calculates a tracking target estimated position that is an estimated position of a tracking target to be tracked by the mobile device, and a tracking target search unit that searches for the tracking target, and the tracking target search unit calculates one or more search routes connecting a current position of the mobile device and a position where the tracking target can exist, generates a search route list in which the calculated one or more search routes are arranged from the top in order of proximity to the tracking target estimated position, and selects a search route in order from the top of the generated search route list, and the mobile device moves according to the search route selected by the information processing device to search for the tracking target.

Moreover, a third aspect of the present disclosure is an information processing method executed in an information processing device, the information processing method including: a tracking target position estimation step of calculating, by a tracking target position estimation unit, a tracking target estimated position that is an estimated position of a tracking target to be tracked by a mobile device; and a step, by a tracking target search unit, of calculating one or more search routes connecting a current position of the mobile device and a position where the tracking target can exist, generating a search route list in which the calculated one or more search routes are arranged from the top in order of proximity to the tracking target estimated position, and selecting a search route in order from the top of the generated search route list, and moving the mobile device according to the selected search route to search for the tracking target.

Moreover, a fourth aspect of the present disclosure is an information processing method executed in an information processing system including a mobile device and an information processing device capable of communicating with the mobile device, the information processing method including:

executing, by the information processing device, tracking target position estimation processing that calculates a tracking target estimated position that is an estimated position of a tracking target to be tracked by the mobile device; and processing that calculates one or more search routes connecting a current position of the mobile device and a position where the tracking target can exist, generates a search route list in which the calculated one or more search routes are arranged from the top in order of proximity to the tracking target estimated position, and selects a search route in order from the top of the generated search route list, and by the mobile device, moving according to the search route selected by the information processing device to search for the tracking target.

Moreover, a fifth aspect of the present disclosure is a program for causing an information processing device to execute information processing, the program including: a tracking target position estimation step of causing a tracking target position estimation unit to calculate a tracking target estimated position that is an estimated position of a tracking target to be tracked by a mobile device, and causing a tracking target search unit to calculate one or more search routes connecting a current position of the mobile device and a position where the tracking target can exist, generate a search route list in which the calculated one or more search routes are arranged from the top in order of proximity to the tracking target estimated position, and select a search route in order from the top of the generated search route list, and move the mobile device according to the selected search route to search for the tracking target.

Note that the program of the present disclosure is, for example, a program that can be provided by a storage medium or a communication medium provided in a computer readable format to an information processing device or a computer system capable of executing various program codes. By providing such a program in a computer-readable format, processing according to the program is realized on the information processing device or the computer system.

Still other objects, features, and advantages of the present disclosure will be clarified by more detailed description based on an embodiment of the present disclosure and accompanying drawings as described later. Note that, in the present specification, a system is a logical set configuration of a plurality of devices, and is not limited to a system in which devices of configurations are in the same housing.

According to a configuration of one embodiment of the present disclosure, a device and a method are implemented that enable efficient rediscovery of a tracking target and restart of tracking in a case where the tracking target to be tracked by a mobile device is lost.

Specifically, for example, a tracking target position estimation unit and a tracking target search unit that searches for a tracking target are included. The tracking target search unit calculates one or more search routes connecting a current position of the mobile device and a position where the tracking target can exist, generates a search route list in which the calculated one or more search routes are arranged from the top in order of proximity to a tracking target estimated position, and selects a search route in order from the top of the generated search route list, and moves the mobile device according to the selected search route to search for the tracking target. It is determined whether or not the tracking target has been detected on the basis of an image captured by a camera mounted on the mobile device, and in a case where the tracking target has been detected, tracking processing is resumed.

According to this configuration, the device and the method are implemented that enable efficient rediscovery of the tracking target and restart of tracking in a case where the tracking target to be tracked by the mobile device is lost.

Note that the effects described in the present specification are merely examples and are not limited, and may have additional effects.

BRIEF DESCRIPTION OF DRAWINGS

FIG. 2 is a diagram for describing an outline of processing executed by the mobile device of the present disclosure.

FIG. 9 is a diagram for describing a configuration and processing of a tracking target position estimation unit.

FIG. 10 is a diagram for describing a configuration and processing of the tracking target position estimation unit.

FIG. 12 is a diagram for describing a configuration and processing of a tracking target search unit.

FIG. 13 is a diagram for describing a specific example of processing executed by the tracking target search unit.

FIG. 14 is a diagram for describing a specific example of processing executed by the tracking target search unit.

MODE FOR CARRYING OUT THE INVENTION

Hereinafter, details of an information processing device, an information processing system, a method, and a program of the present disclosure will be described with reference to the drawings. Note that the description will be made according to the following items.

1. Outline of Tracking Target Search Processing by Mobile Device (Robot) of the Present Disclosure
2. Configuration Example of Mobile Device (Robot) of the Present Disclosure
3. Sequence of Processing Executed by Mobile Device (Robot) of the Present Disclosure 4. Processing Examples According to Various Branch Configurations
5. Configuration Examples of Mobile Device and Information Processing Device of the Present Disclosure
6. Summary of Configurations of the Present Disclosure

1. Outline of Tracking Target Search Processing by Mobile Device (Robot) of the Present Disclosure First, an outline of tracking target search processing by a mobile device (robot) of the present disclosure will be described.

Note that, in the following embodiment, an autonomous traveling type robot will be described as an example of a mobile device that follows a tracking target, but the mobile device of the present disclosure includes not only such an autonomous traveling type robot but also various mobile devices such as an automated vehicle, a drone, and the like.

As described above, when following a tracking target, a mobile device such as a robot and the like performs processing in which the tracking target is placed in a field of view of a camera and the like of the robot, the tracking target is checked, a movement target position is set at a position of the tracking target or immediately before the position, and a movement route to the set target position is generated to move the robot.

However, if a branch route branching into a plurality of routes exists in a traveling direction of the tracking target, and the tracking target suddenly moves from the branch route to a side path, the tracking target may deviate from the field of view of the robot, the robot cannot recognize the tracking target, and the tracking processing cannot be performed.

The present disclosure achieves reliable tracking processing by efficiently finding a tracking target in such a case.

The outline of the tracking target search processing by the robot of the present disclosure will be described with reference to FIG. 1 and subsequent drawings.

Figure 1:
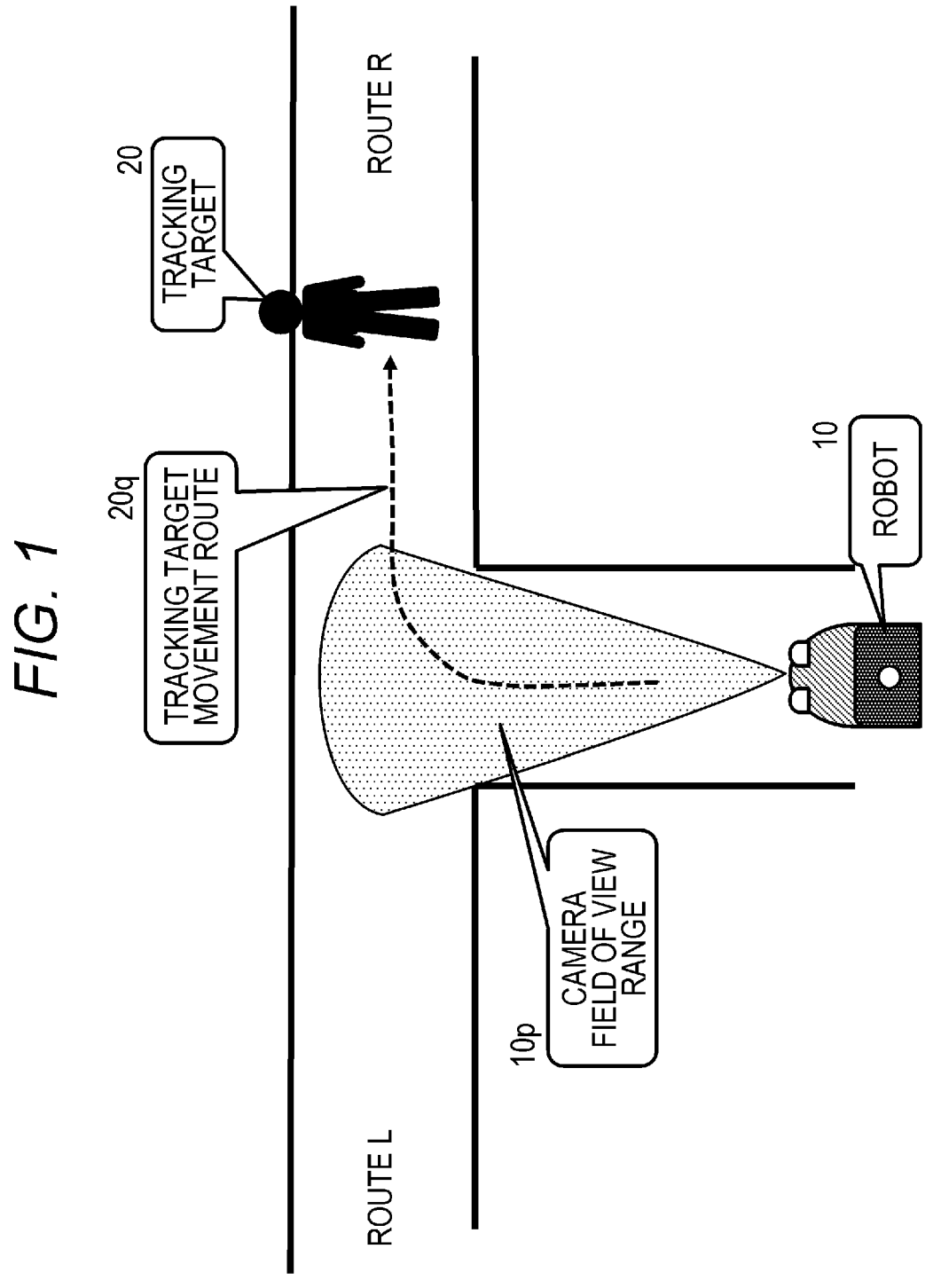
FIG. 1 is a diagram for describing an outline of processing executed by a mobile device of the present disclosure.

FIG. 1 illustrates an example in which a robot 10 moves following a tracking target 20.

The robot 10 performs tracking processing by placing the tracking target 20 in a field of view of a camera 10$p$ mounted on the robot 10 and moving while checking the tracking target 20.

However, in a case where there is a branch route which is a branch point of a route L and a route R as illustrated in FIG. 1, if the tracking target 20 moves along a tracking target movement route 20$q$ indicated by a dotted line in the drawing, the tracking target 20 is out of the field of view of the camera 10$p$ of the robot 10 for the tracking target 20, and the robot 10 loses sight of the tracking target. That is, the robot 10 cannot put the tracking target 20 in a camera field of view range and the tracking target is lost.

In such a case, the robot 10 cannot perform the tracking processing of the tracking target 20.

The robot 10 of the present disclosure can efficiently find the tracking target and restart the tracking processing in such a case.

An outline of processing executed by the robot 10 of the present disclosure will be described with reference to FIG. 2 and subsequent drawings.

FIGS. 2 to 5 are diagrams for describing processing (steps S01 to S04) sequentially executed by the robot 10 of the present disclosure in a case where the tracking target 20 is lost.

These processing steps will be sequentially described.

(Step S01)

First, in a case where the tracking target 20 is lost, in step S01, the robot 10 of the present disclosure calculates a tracking target estimated position as illustrated in FIG. 2.

The robot 10 analyzes a captured image of the tracking target 20, and estimates a position where a probability that the lost tracking target 20 currently exists is high.

For example, a tracking target estimated position 20*b* illustrated in FIG. 2 is calculated. Note that FIG. 2 also illustrates a tracking target (actual position) 20.

(Step S02)

Figure 3:
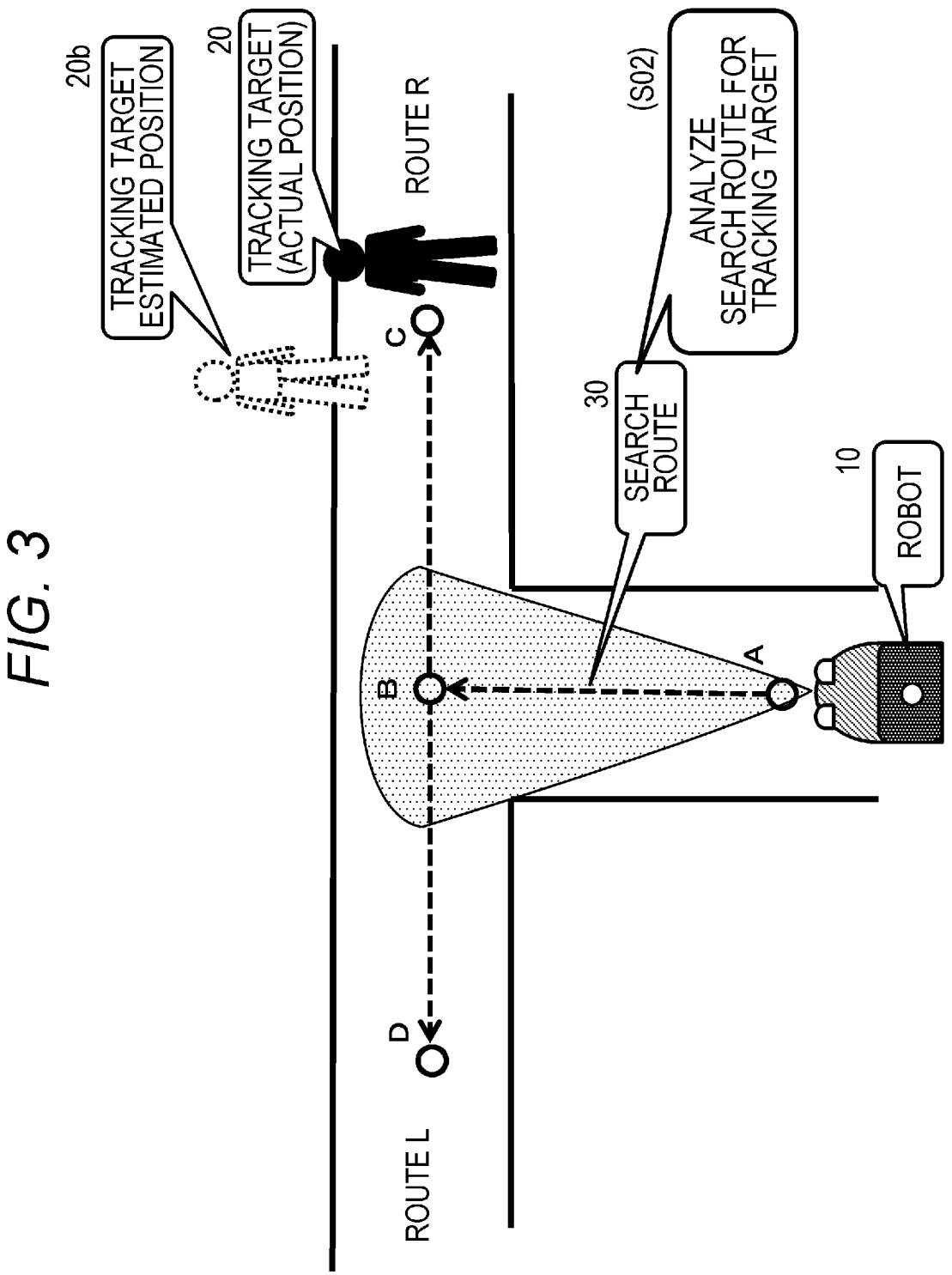
FIG. 3 is a diagram for describing an outline of processing executed by the mobile device of the present disclosure.

Next, in step S02, the robot 10 of the present disclosure analyzes a search route for searching for the tracking target 20 as illustrated in FIG. 3.

The search route is all routes along which the tracking target 20 can move from a current position (A) of the robot 10.

Note that the robot 10 can acquire map data from an internal storage unit or from the outside, and performs a route search with reference to the acquired map data.

In an example illustrated in FIG. 3, the robot 10 determines that the tracking target 20 moves along the route R or the route L on the basis of the acquired map data.

As a result, the search route becomes two routes of A-B-C and A-B-D.

Note that the search route is expressed by a node connection link in which the current position (A) of the robot 10 is set as an origin node, a branch point node (B) set as a branch point is set as an intermediate node, and a point (C or D) on the route after passing through the branch point is set as an end point node.

In the example illustrated in FIG. 3, the robot 10 acquires the following two search routes (node connection links).

A-B-C
A-B-D (Step S03)

Figure 4:
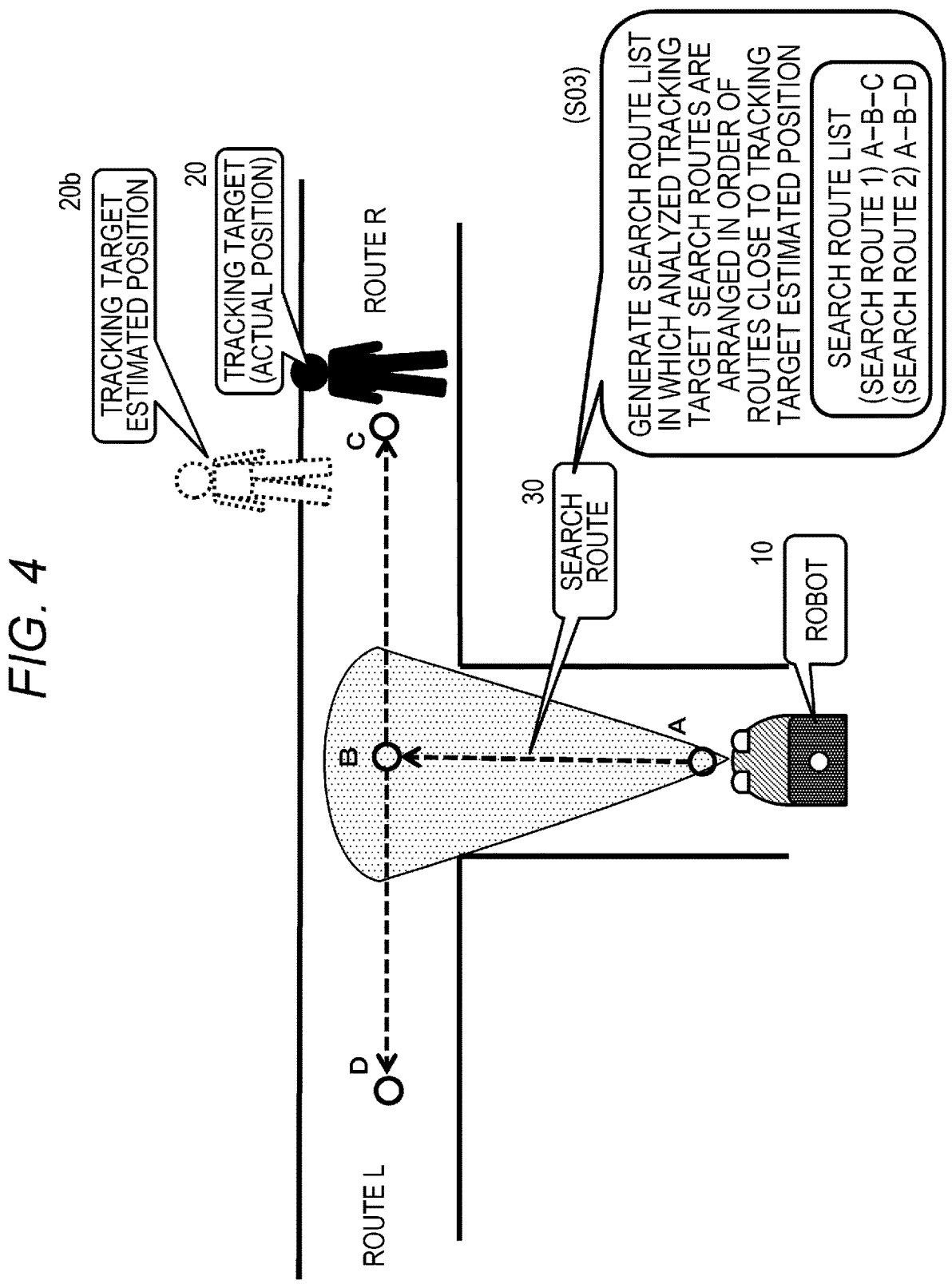
FIG. 4 is a diagram for describing an outline of processing executed by the mobile device of the present disclosure.

Next, in step S03, as shown in FIG. 4, the robot 10 of the present disclosure generates a search route list in which the plurality of search routes (node connection links) acquired in step S02 is arranged in order of routes close to the tracking target estimated position estimated in step S01.

In an example illustrated in FIG. 4, since a route close to the tracking target estimated position 20*b* between the search route (A-B-C) and the search route (A-B-D) is the search route (A-B-C), the following list is generated.

(Search route 1) A-B-C
(Search route 2) A-B-D (Step S04)

Figure 5:
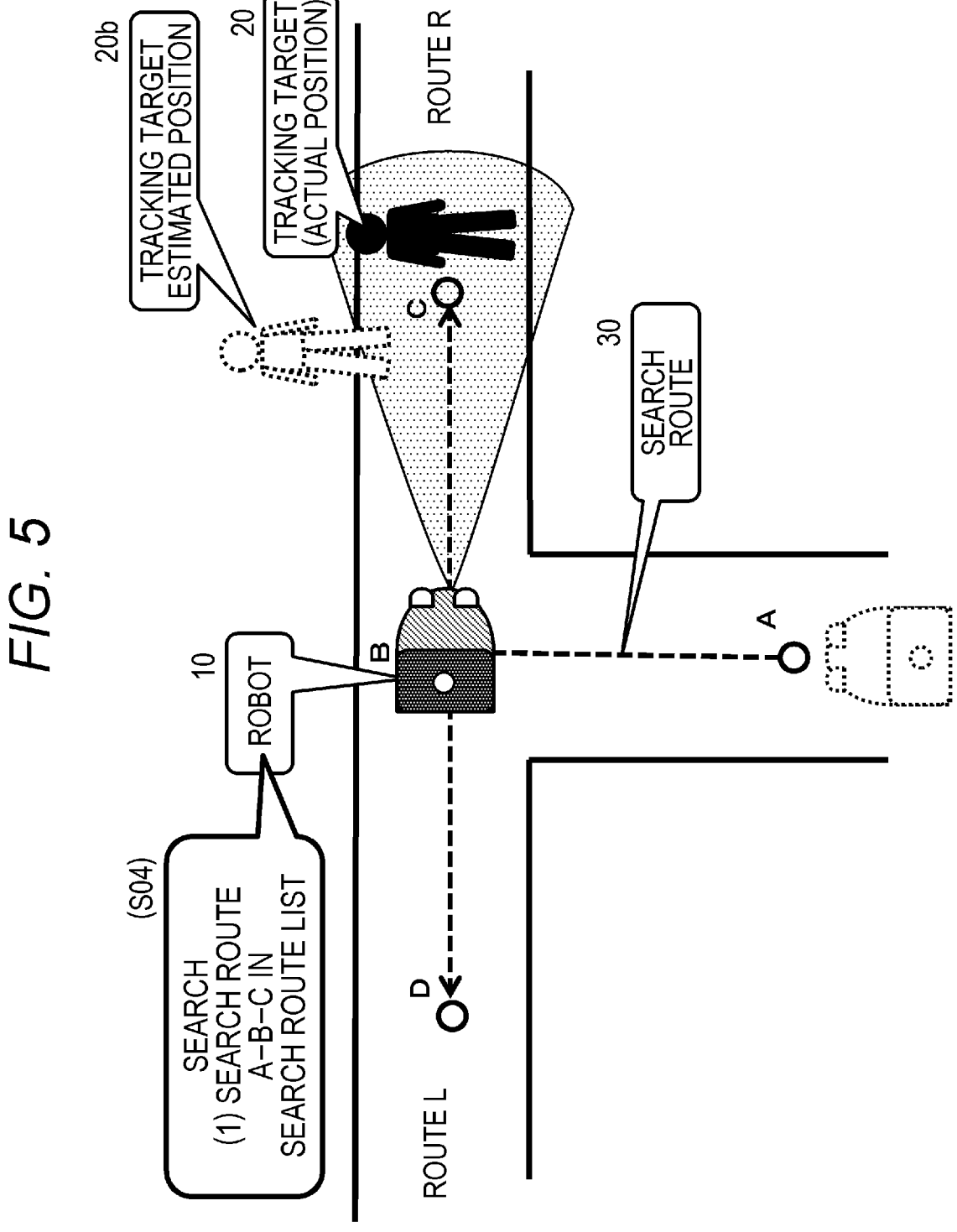
FIG. 5 is a diagram for describing an outline of processing executed by the mobile device of the present disclosure.

Next, in step S04, as illustrated in FIG. 5, the robot 10 of the present disclosure acquires search routes in order of a list of the search route list generated in step S03, moves according to the acquired search route, and searches for the tracking target 20.

In the example described above with reference to FIG. 4, the following two search routes are listed in order in the search route list.

(Search route 1) A-B-C
(Search route 2) A-B-D

The robot 10 first selects (search route 1) A-B-C, which is the first search route in the list, and moves according to (search route 1) A-B-C to search for the tracking target 20.

The robot 10 first moves from the node A to a point of the node B, changes direction in a direction of the node C, and analyzes a camera-captured image of an image in the direction of the node C.

The robot 10 can rediscover the tracking target 20 by analyzing the camera-captured image obtained by imaging in the direction of the node C.

After finding this tracking target 20, the robot 10 resumes the tracking processing of the tracking countermeasure.

Note that, for example, in a case where the tracking target 20 is not found in search processing for the tracking target 20 according to (search route 1) A-B-C, a next search route recorded in the search route list generated in step S03 is acquired, and movement is performed according to the acquired search route to search for the tracking target 20.

This processing example will be described as processing of (step S05) illustrated in FIG. 6.

(Step S05)

Figure 6:
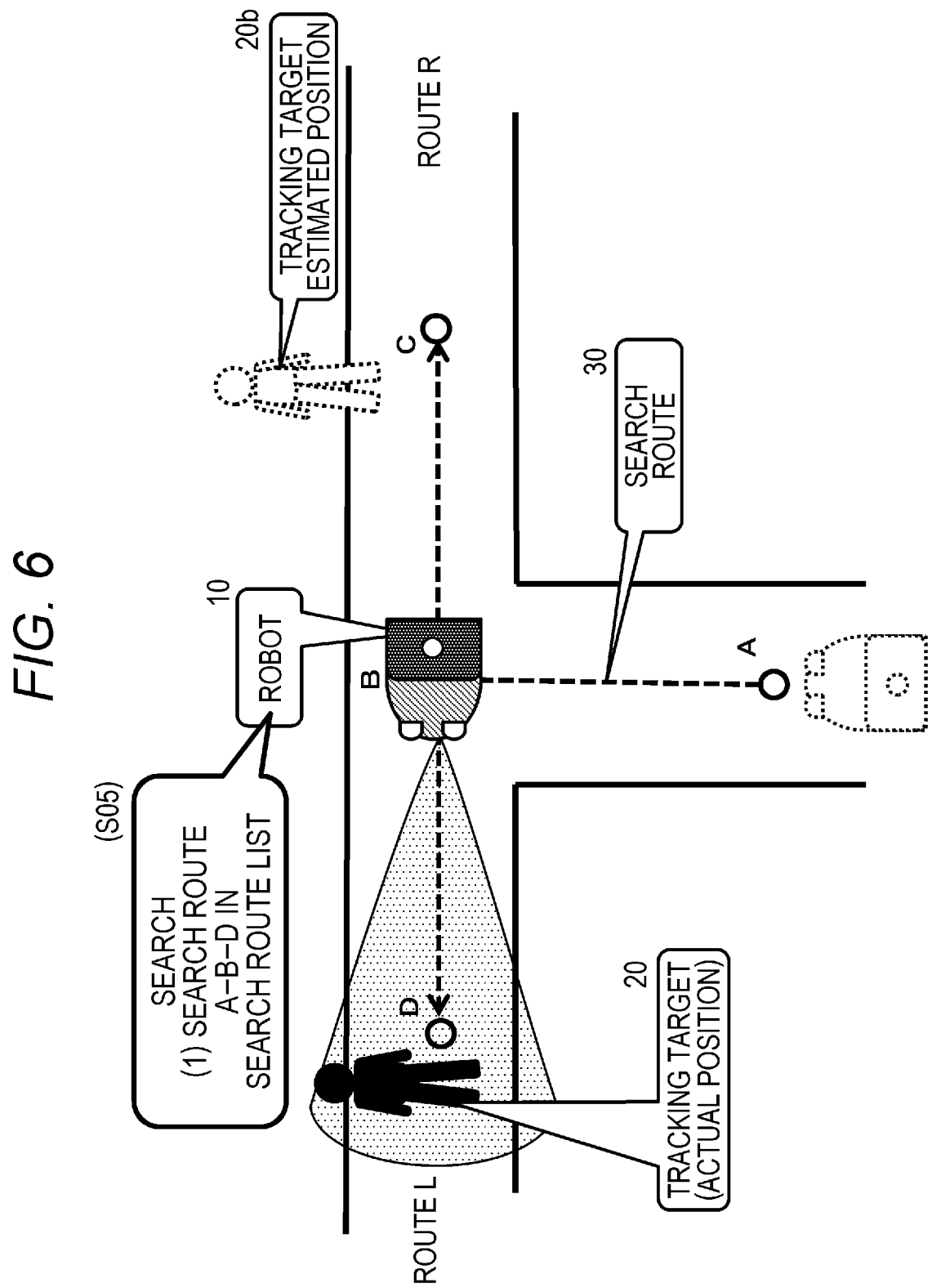
FIG. 6 is a diagram for describing an outline of processing executed by the mobile device of the present disclosure.

The processing in step S05 illustrated in FIG. 6 is processing executed, for example, in a case where the tracking target 20 is not found in the search processing of the tracking target 20 according to (search route 1) A-B-C described with reference to FIG. 5.

For example, as illustrated in FIG. 6, in a case where the tracking target 20 moves in a direction (route L direction) significantly different from the tracking target estimated position 20*b*, this processing in step S05 is executed.

In this case, the robot 10 first selects (search route 2) A-B-D that is the second search route in the list, and moves according to (search route 2) A-B-D to search for the tracking target 20.

Note that, at this point, the robot 10 has already moved from the node A to the point of the node B, and has changed direction in the direction of the node C.

In order to perform search processing according to (search route 2) A-B-D, the robot 10 performs processing that changes the direction of the robot 10 in a direction of a node D. That is, an imaging direction of the camera is set in the direction of the node D.

The robot 10 analyzes a captured image with the imaging direction of the camera set in the direction of the node D.

The robot 10 can rediscover the tracking target 20 by analyzing the camera-captured image obtained by imaging in the direction of the node D.

After finding this tracking target 20, the robot 10 resumes the tracking processing of the tracking countermeasure.

As described above, in a case where the tracking target 20 is lost, that is, lost sight, the robot 10 of the present disclosure sequentially executes the following processing to rediscover the tracking target and continues the tracking processing.

(Step S01)=Calculate estimated position of tracking target (Step S02)=Acquire search route for tracking target (Step S03)=Generate search route list in which search routes for tracking target are arranged in order of proximity to tracking target estimated position (Step S04)=Acquire search routes in order of list of generated search route list, and search for tracking target according to acquired search route By performing the processing according to these steps, the lost tracking target can be efficiently rediscovered, and the tracking processing can be continued.

2. Configuration Example of Mobile Device (Robot) of the Present Disclosure

Next, a configuration example of a mobile device (robot) of the present disclosure will be described.

Note that, as described above, an autonomous traveling type robot will be described as an example of the mobile device that follows a tracking target in the present embodiment, but the mobile device of the present disclosure includes not only such an autonomous traveling type robot but also various mobile devices such as an automated vehicle, a drone, and the like.

For example, in a case of a drone, in a setting for tracking a person who moves on an interior passage of a building or the like, there is a case where it is difficult to determine which passage the person who is a tracking target advances at a branch in the passage in the building. The processing of the present disclosure can also be used for flight route control of the drone in such a case.

Figure 7:
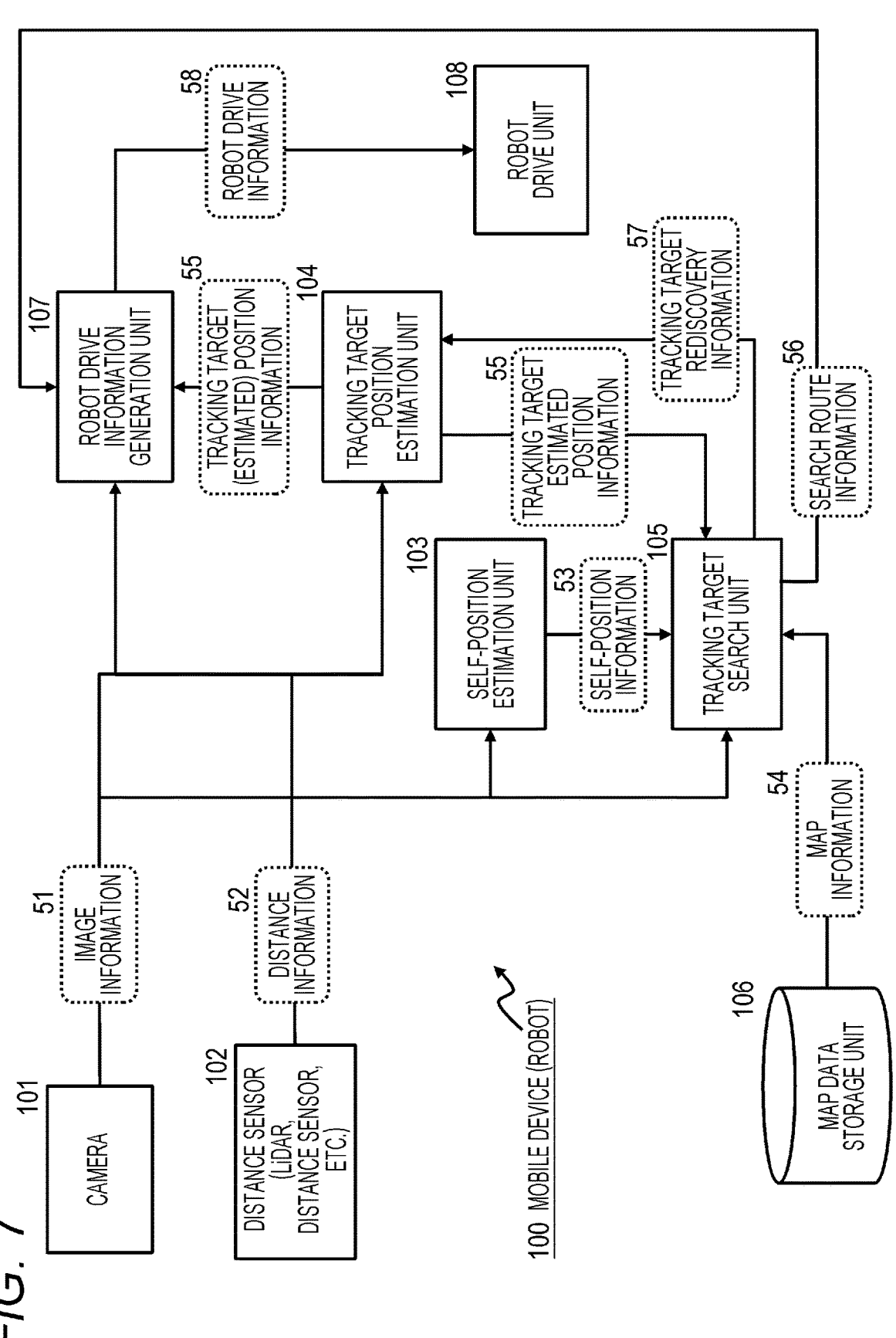
FIG. 7 is a block diagram illustrating a configuration example of a main configuration of a mobile device (robot) of the present disclosure.

FIG. 7 is a block diagram illustrating a configuration example of a main configuration of a mobile device (robot) 100 of the present disclosure.

Note that the mobile device (robot) 100 illustrated in FIG. 7 is a block diagram illustrating a main configuration of the robot 10 illustrated in FIG. 1.

As illustrated in FIG. 7, the mobile device (robot) 100 includes a camera 101, a distance sensor 102, a self-position estimation unit 103, a tracking target position estimation unit 104, a tracking target search unit 105, a map data storage unit 106, a robot drive information generation unit 107, and a robot drive unit 108.

The camera 101 is a camera that captures an image in a traveling direction of the robot 100 or an image of a tracking target, and is, for example, a camera that captures an RGB color image.

The camera 101 generates and outputs image information 51 that is a captured image.

The distance sensor 102 is constituted by, for example, any of an object detection sensor constituted by light detection and ranging, or laser imaging detection and ranging (LiDAR) and the like, or various sensors such as a stereo camera, a ToF sensor, an ultrasonic sensor, a radar, a sonar, and the like, or a combination thereof. The distance sensor generates and outputs distance information 52 including a distance to an object in a traveling direction of the robot 100, for example, an object such as a tracking target, an obstacle, and the like.

The image information 51 that is an image captured by the camera 102 is input to the self-position estimation unit 103, the tracking target position estimation unit 104, the tracking target search unit 105, and the robot drive information generation unit 107.

Similarly, the distance information 52 generated by the distance sensor 102, for example, the distance information 52 including the distance to the object such as the tracking target, the obstacle, and the like is also input to the self-position estimation unit 103, the tracking target position estimation unit 104, the tracking target search unit 105, and the robot drive information generation unit 107.

The self-position estimation unit 103 calculates a current position and posture of the robot 100.

For example, the current position and posture of the mobile device (robot) 100 are calculated by performing simultaneous localization and mapping (SLAM) processing and the like executed as analysis processing of images continuously captured by the camera 102.

Note that the simultaneous localization and mapping (SLAM) processing is processing that executes self-localization (localization) and environmental mapping (mapping) in parallel.

Self-position information 53 generated by the self-position estimation unit 103 is output to the tracking target search unit 105.

The tracking target position estimation unit 104 executes processing that estimates a position of a tracking target followed by the robot 100.

Note that the tracking target position estimation unit 104 inputs sensor detection information of the camera 101, the distance sensor 102, and the like, and performs processing that estimates a position of a tracking target on the basis of the input sensor detection information. The tracking target position estimation unit 104 executes tracking target position estimation processing according to three states corresponding to a confirmation availability status of the tracking target based on the sensor detection information of the camera 101, the distance sensor 102, and the like.

These three states will be described with reference to FIG. 8.

Figure 8:
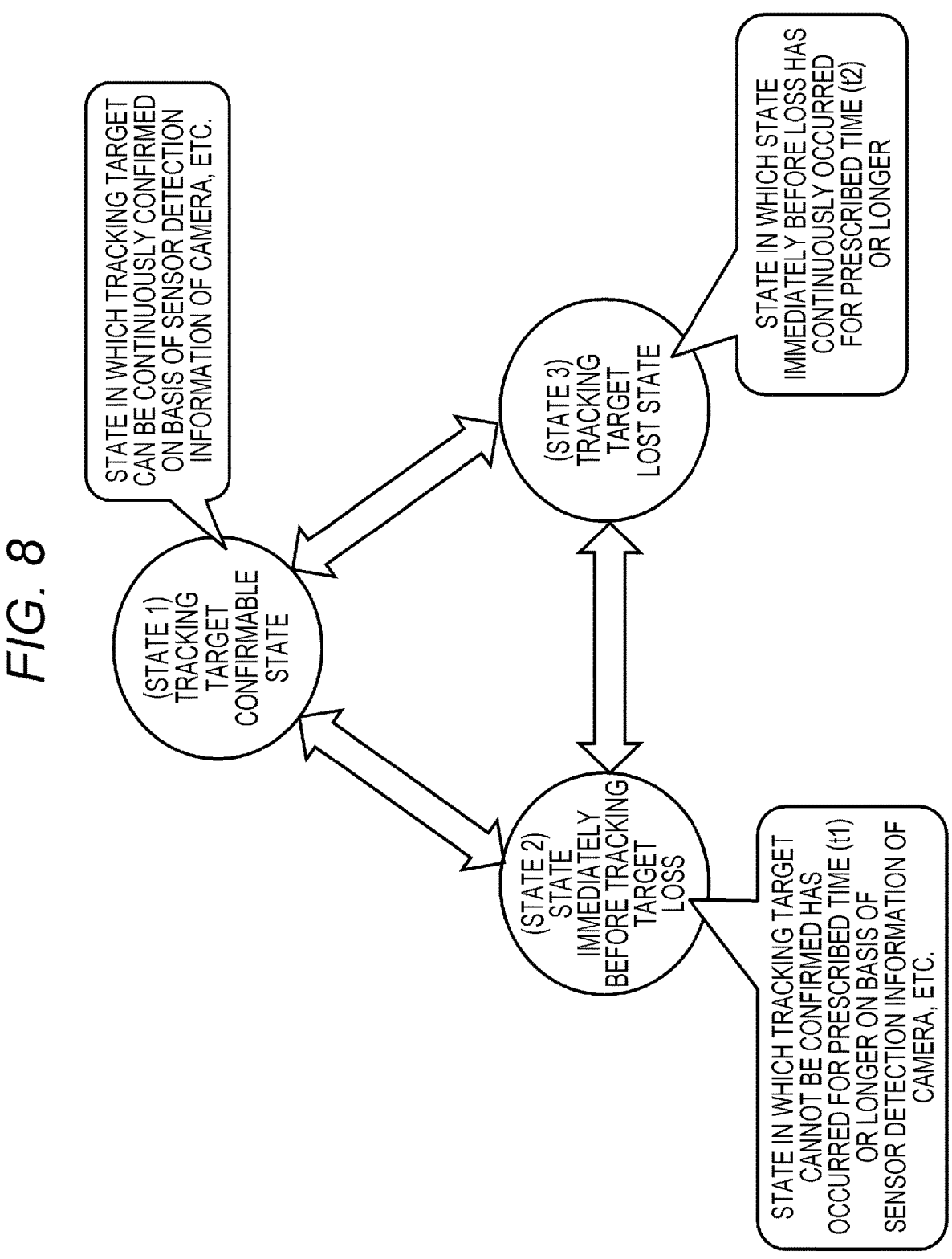
FIG. 8 is a diagram for describing states according to a confirmation availability status of a tracking target of the mobile device (robot) of the present disclosure.

As illustrated in FIG. 8, the following three states are defined.

(State 1) Tracking target confirmable state
(State 2) State immediately before tracking target loss
(State 3) Tracking target lost state (State 1) Tracking target confirmable state is a state in which a tracking target can be continuously confirmed on the basis of sensor detection information of a camera and the like.

(State 2) State immediately before tracking target loss is a state in which a state in which a tracking target cannot be confirmed has occurred for a prescribed time (t1) or longer on the basis of sensor detection information of a camera and the like.

(State 3) Tracking target lost state is a state in which a state immediately before loss has continuously occurred for a prescribed time (t2) or longer.

In "(State 1) Tracking target confirmable state", the tracking target position estimation unit 104 continuously analyzes the position of the tracking target on the basis of the sensor detection information of the camera and the like, and outputs tracking target position information 55 to the robot drive information generation unit 107.

On the other hand, in "(State 2) State immediately before tracking target loss" and "(State 3) Tracking target lost state", estimation processing of a current position of the tracking target is executed using the sensor detection information of the camera and the like of the camera and the like in immediately preceding "(State 1) Tracking target confirmable state" or "(State 2) State immediately before tracking target loss", and tracking target estimated position information 55 acquired as an estimation processing result is output to the robot drive information generation unit 107.

Note that, in this position estimation processing, processing using, for example, tracking target object identification processing, object spatial position estimation processing, or the like is performed. For example, in a case where the tracking target object is a person, the following processing is performed to estimate a position of the tracking target.

(a) Object identification processing (person identification processing)=Image analysis processing that identifies a person from a camera-captured image and sets a person region as a region of interest (ROI).

(b) Tracking target spatial position estimation processing=Synthesizing (fusing) a person region (ROI) of a camera-captured image and distance information of the person region to estimate a current three-dimensional spatial position of a tracking target object (person).

Note that, in three-dimensional position estimation processing of the tracking target, a motion model corresponding to a type of the tracking target object is used. For example, in a case where the tracking target object is a person, position estimation is performed by applying a motion model of the person. For example, in a case where the tracking target object is a car, position estimation is performed by applying a motion model of the car.

Details of the tracking target position estimation processing executed by the tracking target position estimation unit 104 in "(State 2) State immediately before tracking target loss" and "(State 3) Tracking target lost state" will be described with reference to FIGS. 9 and 10.

FIG. 9 is a diagram illustrating a detailed configuration example of the tracking target position estimation unit 104.

As illustrated in FIG. 9, the tracking target position estimation unit 104 includes a tracking target region detection unit 121 and a tracking target three-dimensional position estimation unit 122.

Note that, in a case where the tracking target is a person, the tracking target region detection unit 121 serves as a person region detection unit, and the tracking target three-dimensional position estimation unit 122 serves as a person three-dimensional position estimation unit.

The tracking target region detection unit 121 inputs the image information 51 imaged by the camera 101, and extracts a region of a tracking target, for example, a person, as a region of interest (ROI). Note that the image information 51 to be input is a captured image in "(State 2) state immediately before tracking target loss" or "(State 1) tracking target confirmable state" before "(State 2) state immediately before tracking target loss", and is continuously captured images for a certain period of time.

Tracking target region information (ROI information) 61 indicating the region of the tracking target, for example, the person, extracted from the image information 51 by the tracking target region detection unit 121 as the region of interest (ROI) is input to the tracking target three-dimensional position estimation unit 122.

This tracking target region information (ROI information) 61 is information extracted from the continuously captured images for a certain period of time. That is, it is data in which a movement history of the tracking target can be analyzed.

Each of the following information is input to the tracking target three-dimensional position estimation unit 122.

(a) The tracking target region information (ROI information) 61 generated by the tracking target region detection unit 121

(b) The distance information 52 generated by the distance sensor 102

Note that, the distance information 52 generated by the distance sensor 102 is distance information, for example, distance images (depth data), corresponding to continuously captured images acquired at a timing similar to a capturing timing of the images applied to the generation processing of the tracking target region information (ROI information) 61 in the tracking target region detection unit 121.

The tracking target three-dimensional position estimation unit 122 inputs each information (a) and (b) described above, and estimates a current three-dimensional position of the tracking target on the basis of these input information.

A detailed configuration of the tracking target three-dimensional position estimation unit 122 will be described with reference to FIG. 10.

Figure 10:
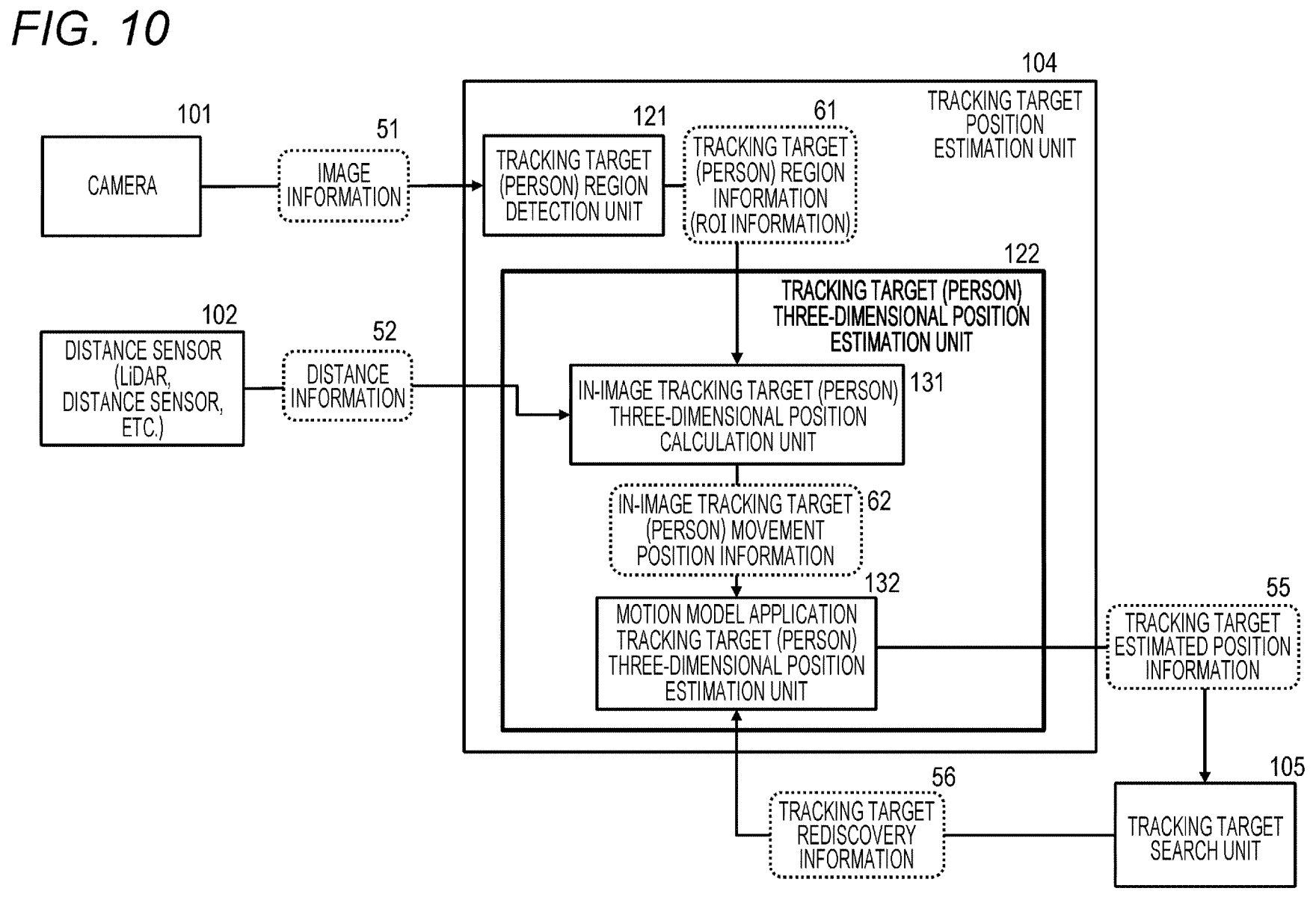

As illustrated in FIG. 10, the tracking target three-dimensional position estimation unit 122 includes an in-image tracking target three-dimensional position calculation unit 131 and a motion model application tracking target three-dimensional position estimation unit 132.

Each of the following information is input to the in-image tracking target three-dimensional position calculation unit 131.

(a) The tracking target region information (ROI information) 61 generated by the tracking target region detection unit 121

(b) The distance information 52 generated by the distance sensor 102

Note that, the distance information 52 generated by the distance sensor 102 is distance information, for example, distance images (depth data), corresponding to a plurality of continuously captured images acquired at a timing similar to a capturing timing of the continuously captured images applied to the generation processing of the tracking target region information (ROI information) 61 in the tracking target region detection unit 121.

The in-image tracking target three-dimensional position calculation unit 131 inputs each information (a) and (b) described above, and calculates, on the basis of these input information, a three-dimensional position of a tracking target object, for example, a person, in a region of the tracking target region information (ROI information) 61 selected from each of the continuously captured images generated by the tracking target region detection unit 121. This calculated data is information indicating a change in the three-dimensional position of the tracking target in the continuously captured images used for the analysis, that is, a movement mode of the tracking target. This information is "in-image tracking target (person) movement position information 62" illustrated in FIG. 10.

The in-image tracking target three-dimensional position calculation unit 131 outputs generated "in-image tracking target (person) movement position information 62" to the motion model application tracking target three-dimensional position estimation unit 132.

The motion model application tracking target three-dimensional position estimation unit 132 estimates a current three-dimensional spatial position of the tracking target object (person) using "in-image tracking target (person) movement position information 62" generated by the in-image tracking target three-dimensional position calculation unit 131.

Note that, in three-dimensional position estimation processing of the tracking target, a motion model corresponding to a type of the tracking target object is used. For example, in a case where the tracking target object is a person, position estimation is performed by applying a motion model of the person. For example, in a case where the tracking target object is a car, position estimation is performed by applying a motion model of the car.

The current three-dimensional spatial position information of the tracking target object (person) estimated by the motion model application tracking target three-dimensional position estimation unit 132 is "tracking target estimated position information 55" illustrated in FIG. 10.

This position information corresponds to, for example, three-dimensional position information indicating a position of "tracking target estimated position 20*b*" described with reference to FIG. 2.

A specific example of processing executed by the tracking target position estimation unit 104 will be described with reference to FIG. 11.

Figure 11:
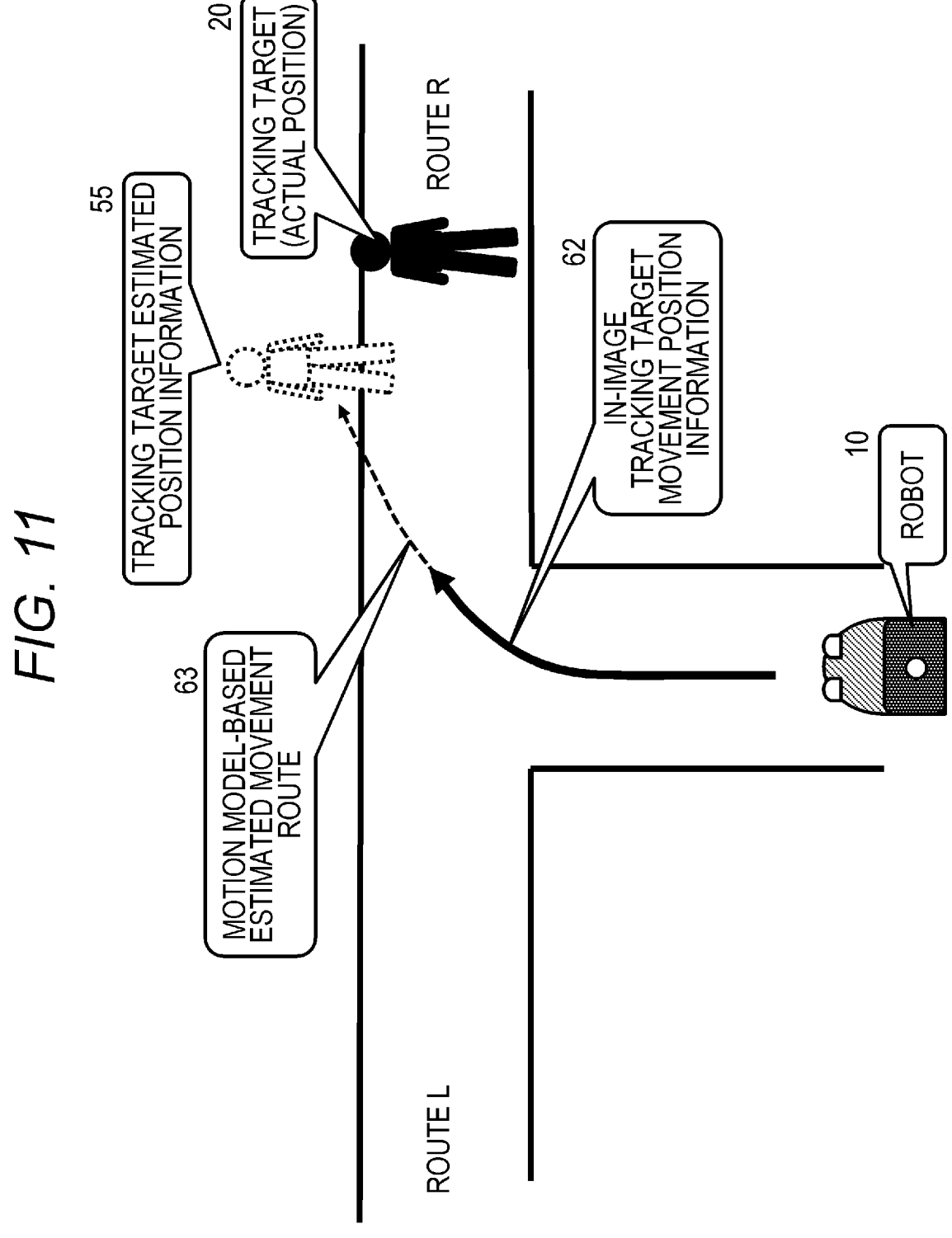
FIG. 11 is a diagram for describing a specific example of processing executed by the tracking target position estimation unit.

FIG. 11 illustrates the tracking target estimated position information 55 estimated by the tracking target position estimation unit 104.

This tracking target estimated position information 55 is generated by synthesis processing of an in-image tracking target movement position information 62 and a motion model-based estimated movement route 63 illustrated in FIG. 11.

The in-image tracking target movement position information 62 illustrated in FIG. 11 is "in-image tracking target (person) movement position information 62" generated by the in-image tracking target three-dimensional position calculation unit 131 illustrated in FIG. 10, and corresponds to a movement trajectory of three-dimensional position information of a tracking target (person) region (ROI) extracted from an image of the tracking target captured by the camera 101.

The motion model-based estimated movement route 63 illustrated in FIG. 11 is an estimated movement route of the tracking target estimated by the motion model application tracking target three-dimensional position estimation unit 132 by applying "in-image tracking target (person) movement position information 62" and the motion model of the person, that is, an estimated movement route up to current time.

An end point of this estimated movement route is an estimated position of the tracking target at the current time, that is, the tracking target estimated position information 55.

"Tracking target estimated position information 55" generated by the motion model application tracking target three-dimensional position estimation unit 132 is output to the tracking target search unit 105.

Next, the tracking target search unit 105 illustrated in FIG. 7 will be described.

The tracking target search unit 105 executes search processing of a lost tracking target.

That is, the tracking target search processing described above with reference to FIGS. 3 to 6 is executed.

First, as illustrated in FIG. 3, a search route for searching for the tracking target 20 is calculated.

As described with reference to FIG. 3, the search route is all the routes on which the tracking target 20 can move from the current position (A) of the robot 10. On the basis of map data, all the search routes of the route on which the tracking target 20 can move are calculated.

In the example of FIG. 3, the search route is two routes of A-B-C and A-B-D.

Next, as illustrated in FIG. 4, a search route list in which a plurality of calculated search routes (node connection links) is arranged in order of routes close to the tracking target estimated position is generated.

In an example illustrated in FIG. 4, since a route close to the tracking target estimated position 20*b* between the search route (A-B-C) and the search route (A-B-D) is the search route (A-B-C), the following list is generated.

(Search route 1) A-B-C
(Search route 2) A-B-D

Next, as described with reference to FIGS. 5 and 6, the search route is acquired in order of a list of the generated search route list, and movement is performed according to the acquired search route to search for the tracking target 20.

As illustrated in FIG. 7, in a case where the tracking target is rediscovered as a result of the tracking target search processing, the tracking target search unit 105 outputs tracking target rediscovery information 57 to the tracking target position estimation unit 104.

The tracking target rediscovery information 57 is information indicating that the camera 101 of the robot 100 can image the tracking target.

In response to input of the tracking target rediscovery information 57, the tracking target position estimation unit 104 generates tracking target (estimated) position informationtion 55, and outputs the tracking target (estimated) position information to the robot drive information generation unit 107.

The robot drive information generation unit 107 restarts the tracking processing of the tracking target in accordance with the tracking target (estimated) position information 55 input from the tracking target position estimation unit 104, that is, the position information about the tracking target specified by the camera 101.

A detailed configuration of the tracking target search unit 105 will be described with reference to FIG. 12.

As illustrated in FIG. 12, the tracking target search unit 105 includes a search route analysis unit 151, a search route determination unit 152, and a tracking target detection confirmation unit 153.

Note that, in a case where the tracking target is a person, the tracking target detection confirmation unit 153 functions as a person detection confirmation unit.

The search route analysis unit 151 generates a robot existence route 71 that is a route including a current position of a robot at the time when a tracking target is lost (lost sight) and a tracking target existence allowable route 72 that is a route where a tracking target can exist.

That is, one or more search routes connecting the current position of the robot and a position where the tracking target can exist are calculated.

Note that these route information are acquired with reference to map information 54 acquired from the map data storage unit 106.

The search route analysis unit 151 inputs each of the following data.

(a) The tracking target estimated position information 55 generated by the tracking target position estimation unit 104, (b) The self-position information 53 generated by the self-position estimation unit 103, and (c) The map information 54 stored in the map data storage unit 106.

The search route analysis unit 151 uses these data to generate the robot existence route 71 and the tracking target existence allowable route 72.

A specific example of processing executed by the search route analysis unit 151 will be described with reference to FIG. 13.

Figure 13:
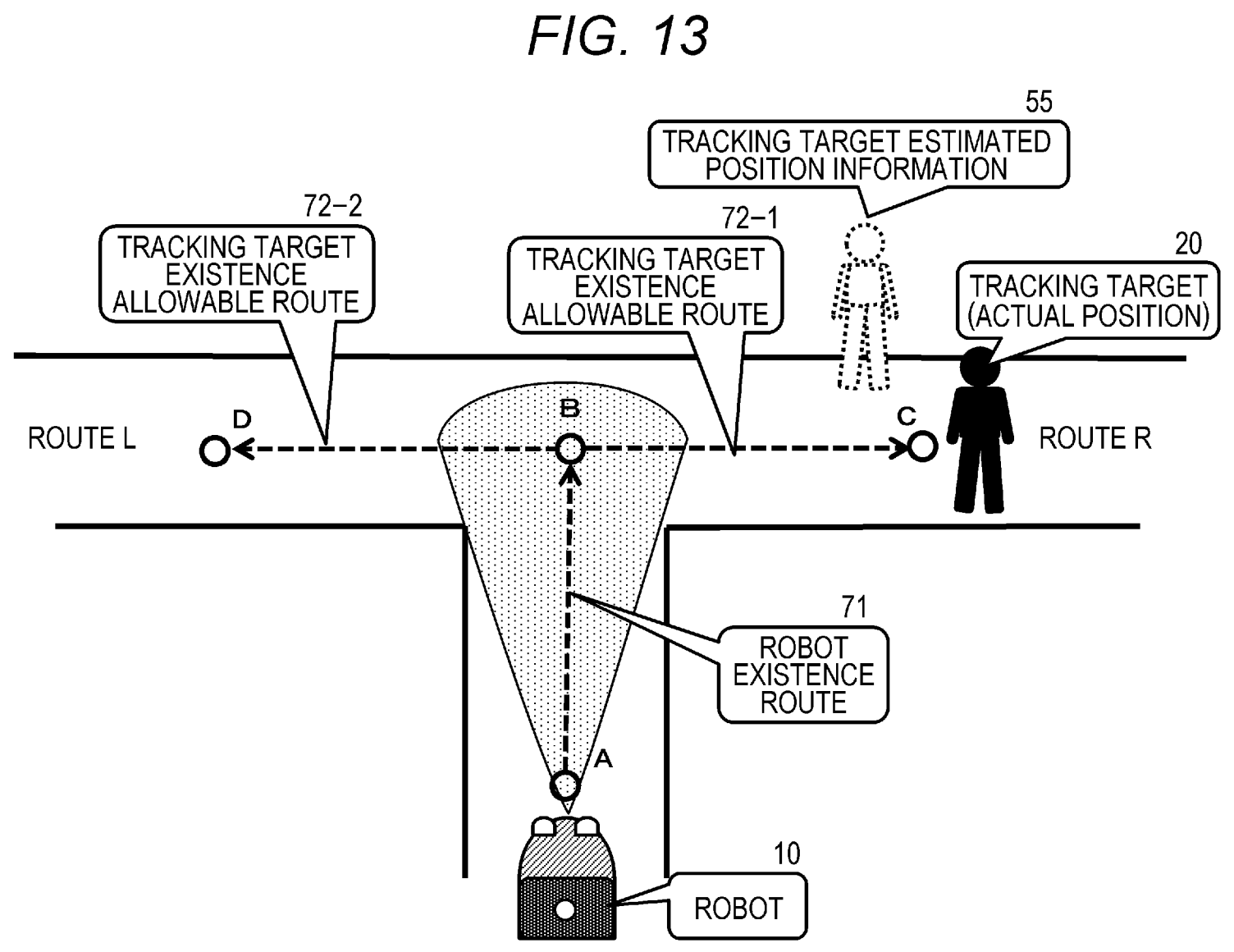

As illustrated in FIG. 13, the search route analysis unit 151 analyzes a search route for searching for the tracking target 20.

The search route is all routes along which the tracking target 20 can move from a current position (A) of the robot 10. The search route analysis unit 151 acquires the map information 54 from the map data storage unit 106, and performs a route search with reference to the acquired map information.

In an example illustrated in FIG. 13, the search route analysis unit 151 estimates that the tracking target 20 moves along the route R or the route L on the basis of the map information 54 acquired from the map data storage unit 106.

As a result, the search route analysis unit 151 generates the following robot existence route 71 and tracking target existence allowable route 72.

Robot existence route=A-B

Tracking target existence allowable route=B-C, B-D

The search route analysis unit 151 outputs the robot existence route 71 and the tracking target existence allowable route 72 to the search route determination unit 152.

The search route determination unit 152 generates a search route list 73 in which a route to be preferentially searched is set higher by using the robot existence route 71 and the tracking target existence allowable route 72 input from the search route analysis unit 151.

The search route list 73 is a list in which a route to be preferentially searched is set higher, and is generated as a search route list in which search routes are arranged in order of having a route close to the tracking target estimated position information 55 generated by the tracking target position estimation unit 104.

First, the search route determination unit 152 generates one or more search routes on the basis of the robot existence route 71 and the tracking target existence allowable route 72 input from the search route analysis unit 151. In a case of the specific example illustrated in FIG. 13, the search route determination unit 152 generates the following two search routes (node connection links).

A-B-C

A-B-D

As described above with reference to FIG. 3, the search route is expressed by a node connection link in which the current position (A) of the robot 10 is set as an origin node, a branch point node (B) set as a branch point is set as an intermediate node, and a point (C or D) on the route after passing through the branch point is set as an end point node.

For each of the two search routes (node connection links), the search route determination unit 152 generates a search route list 73 in which the search routes are arranged in order of having a route close to the tracking target estimated position information 55 generated by the tracking target position estimation unit 104.

Specifically, for example, the search route list 73 illustrated in FIG. 14 is generated.

In an example illustrated in FIG. 14, since a route close to the tracking target estimated position 20b between the search route (A-B-C) and the search route (A-B-D) is the search route (A-B-C), the following search route list 73 is generated.

(Search route 1) A-B-C (Search route 2) A-B-D

The search route determination unit 152 acquires search routes in order from the top of the generated search route list 73, and outputs the acquired search routes to the robot drive information generation unit 107 as search route information 56.

As illustrated in FIG. 7, the robot drive information generation unit 107 generates robot drive information 58 for moving the robot according to the search route information 56 input from the search route determination unit 152, and outputs the robot drive information to the robot drive unit 108.

The robot drive unit 108 moves the robot 10 in accordance with the robot drive information 58 input from the robot drive information generation unit 107 to perform tracking target search processing.

A specific search processing example will be described with reference to FIG. 14.

In the search route list 73, the following two search routes are listed in order.

(Search route 1) A-B-C (Search route 2) A-B-D

The search route determination unit 152 selects (search route 1) A-B-C, which is the first search route in the list, and outputs this (search route 1) A-B-C to the robot drive information generation unit 107 as the search route information 56.

The robot drive information generation unit 107 generates the robot drive information 58 for moving the robot according to "(search route 1) A-B-C", which is the search route information 56 input from the search route determination unit 152, and outputs the robot drive information to the robot drive unit 108.

The robot drive unit 108 moves the robot 10 according to "(search route 1) A-B-C" in accordance with the robot drive information 58 input from the robot drive information generation unit 107, and performs the tracking target search processing.

Figure 15:
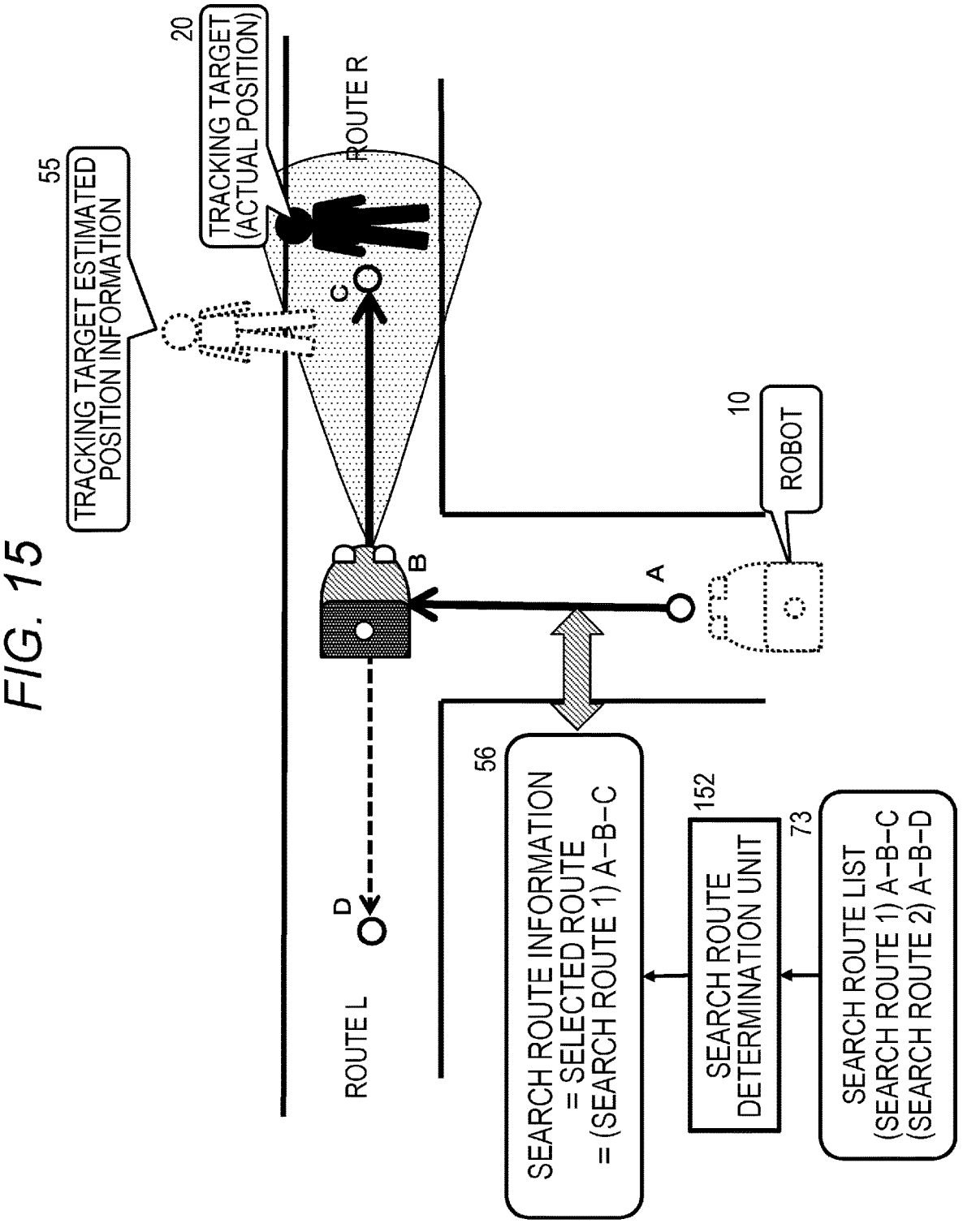
FIG. 15 is a diagram for describing a specific example of processing executed by the tracking target search unit.

FIG. 15 illustrates a specific search processing example of the robot 10 according to "(search route 1) A-B-C".

The robot 10 first moves from the node A to a point of the node B, changes direction in a direction of the node C, and analyzes a camera-captured image of an image in the direction of the node C.

The robot 10 can rediscover the tracking target 20 by analyzing the camera-captured image obtained by imaging in the direction of the node C.

The tracking target detection confirmation unit 153 of the tracking target search unit 105 illustrated in FIG. 12 inputs the image information of the camera 101 and the distance information 52 of the distance sensor 102, and confirms whether or not a tracking target has been detected.

In a case where the tracking target has been detected, tracking target detection information 56 illustrated in FIG. 12 is output to tracking target position estimation unit 104.

In this case, for example, the tracking target position estimation unit 104 analyzes a position of the tracking target in the image captured by the camera 101, generates tracking target position information 55 illustrated in FIG. 7, and outputs the tracking target position information to the robot drive information generation unit 107.

Thereafter, normal tracking processing that follows the tracking target captured in the image captured by the camera 101 is resumed.

On the other hand, in a case where the tracking target detection confirmation unit 153 determines that the tracking target has not been detected even if the image information of the camera 101 and the distance information 52 of the distance sensor 102 are input and analyzed, tracking target detection failure information 74 illustrated in FIG. 12 is output to the search route determination unit 152.

In this case, the search route determination unit 152 acquires a next search route recorded in the search route list 73, and movement is performed according to the acquired search route to search for the tracking target.

This processing example will be described with reference to FIG. 16.

Figure 16:
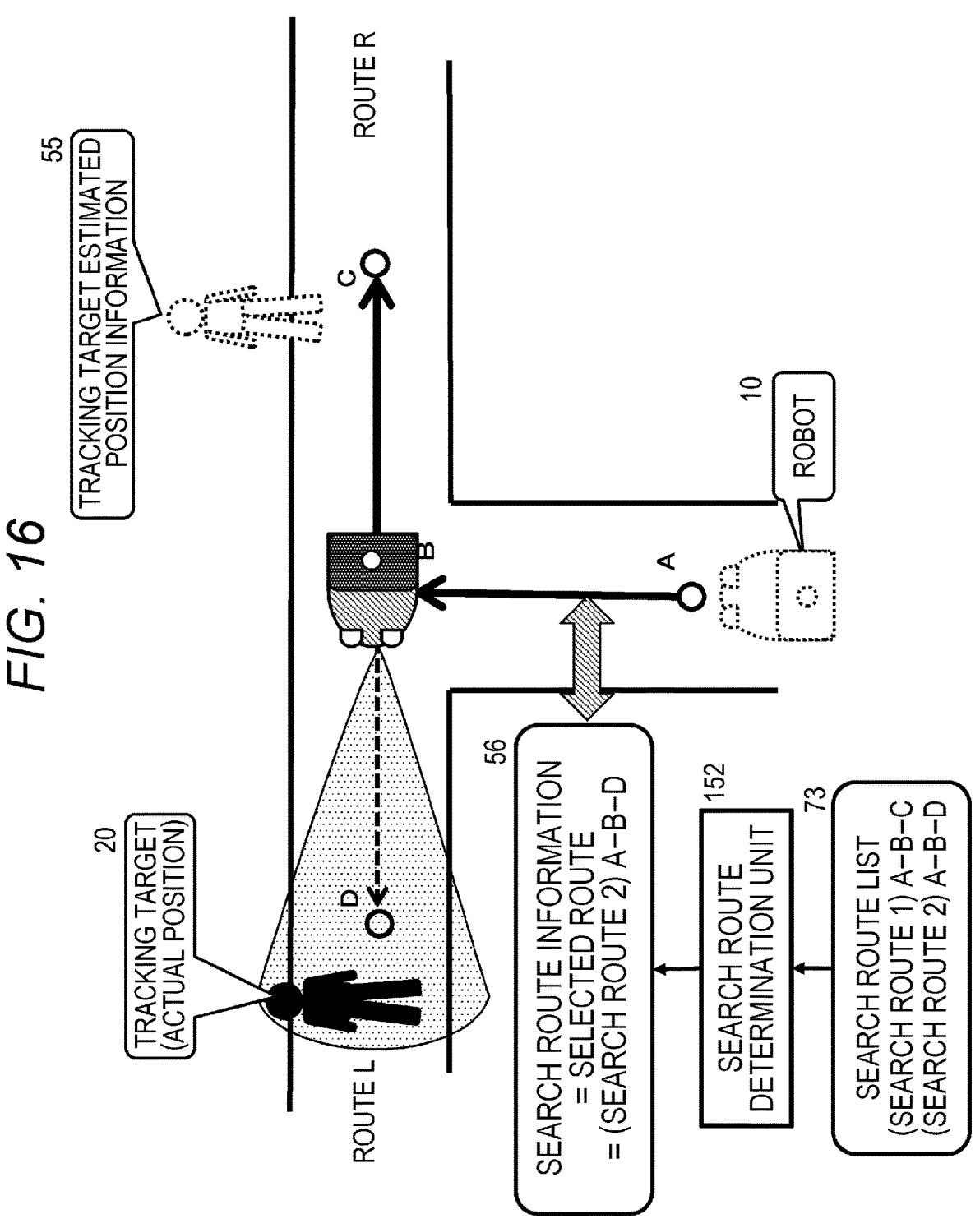
FIG. 16 is a diagram for describing a specific example of processing executed by the tracking target search unit.

The processing illustrated in FIG. 16 is, for example, processing executed in a case where the tracking target 20 has not been found in the search processing for the tracking target 20 according to (search route 1) A-B-C described with reference to FIG. 15.

For example, as illustrated in FIG. 16, in a case where the tracking target 20 moves in a direction (route L direction) largely different from the tracking target estimated position 20b, the tracking target 20 cannot be found in the search processing for the tracking target 20 according to (search route 1) A-B-C.

In this case, the search route determination unit 152 selects (search route 2) A-B-D, which is the next search route recorded in the search route list 73, and outputs this (search route 2) A-B-D to the robot drive information generation unit 107 as the search route information 56.

The robot drive information generation unit 107 generates the robot drive information 58 for moving the robot according to "(search route 2) A-B-D", which is the search route information 56 input from the search route determination unit 152, and outputs the robot drive information to the robot drive unit 108.

Note that, at this point, the robot 10 has already moved from the node A to the point of the node B, and has changed direction in the direction of the node C.

In order to perform the search processing according to (search route 2) A-B-D, the robot drive information generation unit 107 generates the robot drive information 58 for changing the direction of the robot 10 in a direction of the node D, and outputs the robot drive information to the robot drive unit 108.

The robot drive unit 108 sets the direction of the robot 10 in the direction of the node D.

As a result, the camera 101 succeeds in capturing an image of the tracking target 20 on the route L side. Thereafter, the tracking target detection confirmation unit 153 of the tracking target search unit 105 illustrated in FIG. 12 outputs the tracking target detection information 56 illustrated in FIG. 12 to the tracking target position estimation unit 104. For example, the tracking target position estimation unit 104 analyzes a position of the tracking target in an image captured by the camera 101, generates the tracking target position information 55 illustrated in FIG. 7, and outputs the tracking target position information to the robot drive information generation unit 107.

Thereafter, normal tracking processing that follows the tracking target captured in the image captured by the camera 101 is resumed.

The specific examples of the configuration and processing of the mobile device (robot) 100 of the present disclosure have been described above with reference to FIGS. 7 to 16.

As described above, in a case where the tracking target 20 is lost, that is, lost sight, the mobile device (robot) 100 of the present disclosure sequentially executes the following processing to rediscover the tracking target and continues the tracking processing.

(Step S01)=Calculate estimated position of tracking target (Step S02)=Acquire search route for tracking target (Step S03)=Generate search route list in which search routes for tracking target are arranged in order of proximity to tracking target estimated position (Step S04)=Acquire search routes in order of list of generated search route list, and search for tracking target according to acquired search route By performing the processing according to these steps, the lost tracking target can be efficiently rediscovered, and the tracking processing can be continued.

3. Sequence of Processing Executed by Mobile Device (Robot) of the Present Disclosure Next, a sequence of processing executed by the mobile device (robot) 100 of the present disclosure will be described with reference to a flowchart illustrated in FIG. 17.

Figure 17:
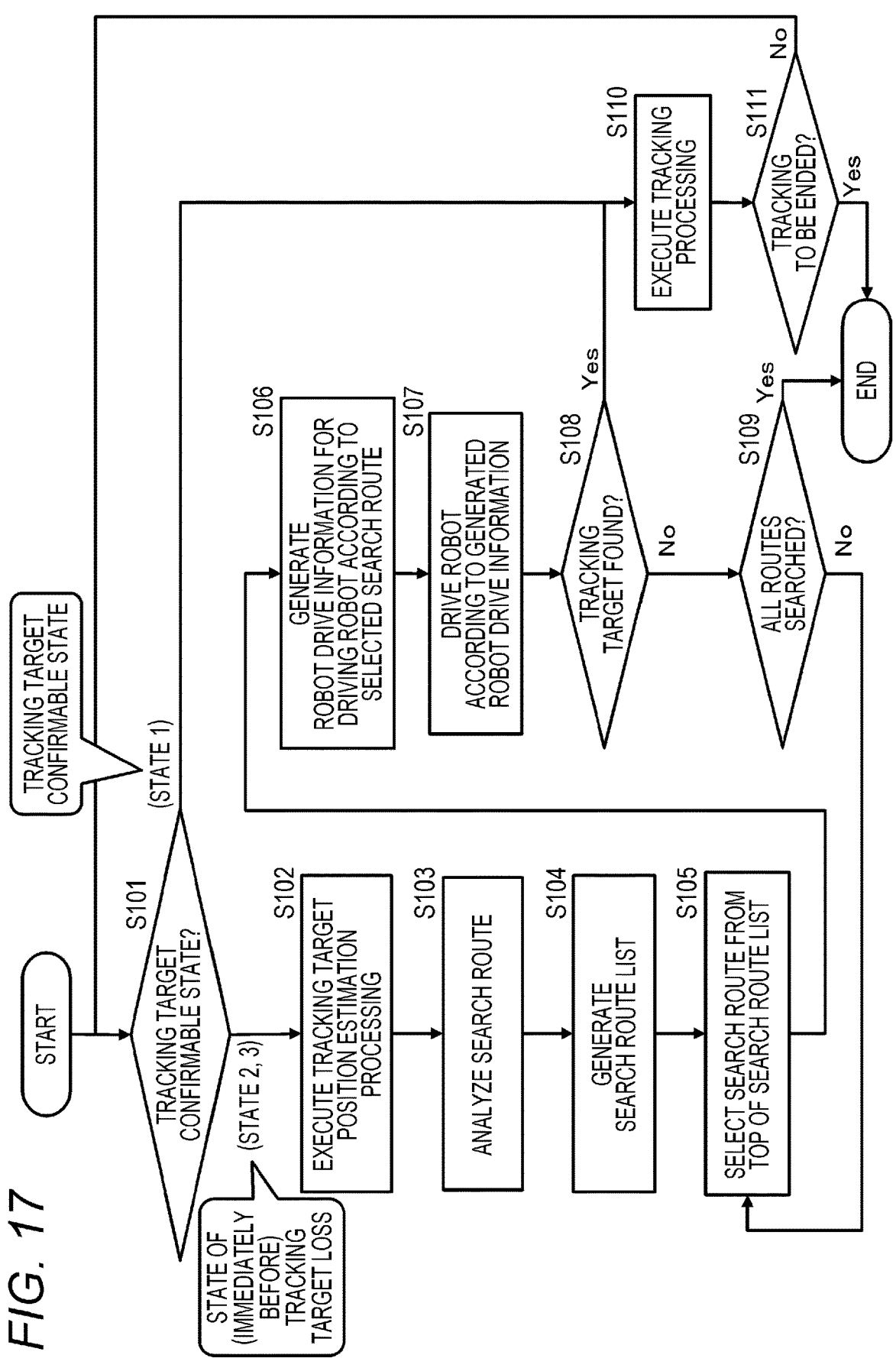
FIG. 17 is a diagram illustrating a flowchart for describing a sequence of processing executed by the mobile device of the present disclosure.

Note that processing according to the flowcharts in FIG. 17 and subsequent drawings can be executed according to a program stored in a storage unit of the mobile device (robot) 100, for example. For example, the processing is executed under the control of a data processing unit (control unit) including a CPU and the like having a program execution function.

Hereinafter, processing of each step of the flowchart illustrated in FIG. 17 will be sequentially described.

(Step S101)

First, a tracking target confirmable state of the mobile device (robot) 100 is determined.

This state determination processing is the following three-state determination processing described above with reference to FIG. 8.

(State 1) Tracking target confirmable state (State 2) State immediately before tracking target loss (State 3) Tracking target lost state (State 1) Tracking target confirmable state is a state in which a tracking target can be continuously confirmed on the basis of sensor detection information of a camera and the like.

(State 2) State immediately before tracking target loss is a state in which a state in which a tracking target cannot be confirmed has occurred for a prescribed time (t1) or longer on the basis of sensor detection information of a camera and the like.

(State 3) Tracking target lost state is a state in which a state immediately before loss has continuously occurred for a prescribed time (t2) or longer.

In step S101, in a case where it is determined that the mobile device (robot) 100 is in this (State 1)

(State 1) Tracking target confirmable state, the process proceeds to step S110.

On the other hand, in step S101, in a case where it is determined that the mobile device (robot) 100 is in either one of these (State 2) or (State 3)

(State 2) State immediately before tracking target loss (State 3) Tracking target lost state, the process proceeds to step S102.

(Step S102)

In step S101, in a case where it is determined that the mobile device (robot) 100 is in either one of these (State 2) or (State 3)

(State 2) State immediately before tracking target loss (State 3) Tracking target lost state, the process proceeds to step S102.

In this case, the mobile device (robot) 100 executes tracking target position estimation processing in step S102.

This processing is executed by the tracking target position estimation unit 104 illustrated in FIG. 7.

As described above with reference to FIGS. 9 to 11, the tracking target position estimation unit 104 performs the tracking target position estimation processing using the tracking target object identification processing, the object spatial position estimation processing, and the like.

For example, in a case where the tracking target object is a person, the following processing is performed to estimate a position of the tracking target.

(a) Object identification processing (person identification processing)=Image analysis processing that identifies a person from a camera-captured image and sets a person region as a region of interest (ROI).

(b) Tracking target spatial position estimation processing=Synthesizing (fusing) a person region (ROI) of a camera-captured image and distance information of the person region to estimate a current three-dimensional spatial position of a tracking target object (person).

Note that, in this tracking target position estimation processing, a motion model corresponding to a type of the tracking target object is used. For example, in a case where the tracking target object is a person, position estimation is performed by applying a motion model of the person. For example, in a case where the tracking target object is a car, position estimation is performed by applying a motion model of the car.

For example, the tracking target position estimation information 55 as illustrated in FIG. 11 is generated by the tracking target position estimation processing in this step S102.

(Step S103)

Next, in step S103, the mobile device (robot) 100 analyzes a search route for searching for a tracking target.

This processing is processing executed by the tracking target search unit 105 illustrated in FIG. 7.

Specifically, it is executed by the search route analysis unit 151 of the tracking target search unit 105 illustrated in FIG. 12.

As described above with reference to FIGS. 12 and 13, the search route analysis unit 151 inputs each of the following data.

(a) The tracking target estimated position information 55 generated by the tracking target position estimation unit 104, (b) The self-position information 53 generated by the self-position estimation unit 103, and (c) The map information 54 stored in the map data storage unit 106.

The search route analysis unit 151 uses these data to analyze a search route for searching for the tracking target 20.

That is, one or more search routes connecting the current position of the robot and a position where the tracking target can exist are calculated.

Specifically, the robot existence route 71 and the tracking target existence allowable route 72 described with reference to FIGS. 12 and 13 are generated.

(Step S104)

Next, in step S104, the mobile device (robot) 100 generates a search route list for searching for a tracking target.

This processing is processing executed by the tracking target search unit 105 illustrated in FIG. 7.

Specifically, it is executed by the search route determination unit 152 of the tracking target search unit 105 illustrated in FIG. 12.

As described above with reference to FIGS. 12 and 14, the search route determination unit 152 generates the search route list 73 in which the route to be preferentially searched is set higher by using the robot existence route 71 and the tracking target existence allowable route 72 input from the search route analysis unit 151.

The search route list 73 is a list in which a route to be preferentially searched is set higher, and is a search route list in which search routes are arranged in order of having a route close to the tracking target estimated position information 55 generated by the tracking target position estimation unit 104.

(Step S105)

Next, in step S105, the mobile device (robot) 100 selects a search route from the top of the search route list generated in step S104.

This processing is processing executed by the tracking target search unit 105 illustrated in FIG. 7.

Specifically, it is executed by the search route determination unit 152 of the tracking target search unit 105 illustrated in FIG. 12.

As described above with reference to FIGS. 15 and 16, the search route determination unit 152 acquires search routes in order from the top of the search route list generated in step S104, and outputs the acquired search routes to the robot drive information generation unit 107 as the search route information 56.

(Step S106)

Next, in step S106, the mobile device (robot) 100 generates robot drive information for moving the robot according to the search route selected from the top of the search route list in step S105.

This processing is processing executed by the robot drive information generation unit 107 illustrated in FIG. 7.

As illustrated in FIG. 7, the robot drive information generation unit 107 generates robot drive information 58 for moving the robot according to the search route information 56 input from the search route determination unit 152, and outputs the robot drive information to the robot drive unit 108.

(Step S107)

Next, in step S107, the mobile device (robot) 100 drives the robot according to the robot drive information generated by the robot drive information generation unit 107 in step S106.

This processing is processing executed by the robot drive unit 108 illustrated in FIG. 7.

As illustrated in FIG. 7, the robot drive unit 108 moves the robot 10 in accordance with the robot drive information 58 input from the robot drive information generation unit 107, and performs tracking target search processing.

(Step S108)

Next, in step S108, the mobile device (robot) 100 determines whether or not a tracking target has been found.

This processing is processing executed by the tracking target search unit 105 illustrated in FIG. 7.

Specifically, it is executed by the tracking target detection confirmation unit 153 of the tracking target search unit 105 illustrated in FIG. 12.

The tracking target detection confirmation unit 153 of the tracking target search unit 105 illustrated in FIG. 12 inputs the image information of the camera 101 and the distance information 52 of the distance sensor 102, and confirms whether or not a tracking target has been detected.

In a case where the tracking target has been detected, a determination in step S108 is Yes, and the process proceeds to step S110.

On the other hand, in a case where the tracking target has not been detected, the determination in step S108 is No, and the process proceeds to step S109.

(Step S109)

Next, in step S109, the mobile device (robot) 100 determines whether or not the search processing for all the search routes in the search route list generated in step S104 has been completed.

This processing is processing executed by the tracking target search unit 105 illustrated in FIG. 7.

Specifically, it is executed by the search route determination unit 152 of the tracking target search unit 105 illustrated in FIG. 12.

The search route determination unit 152 determines whether or not the search processing for all the search routes in the generated search route list has been completed.

In a case where it is determined that the search processing has been completed, it is determined that the search for the tracking target has failed, and the processing ends.

On the other hand, in a case where the processing has not been completed, the processing returns to step S105. Moreover, a next search route in the search route list is selected, and the processing in step S106 and subsequent steps is executed. That is, the robot is driven according to the next search route to confirm detection of the tracking target.

(Step S110)

In step S101, in a case where it is determined that the mobile device (robot) 100 is in this (State 1)

(State 1) Tracking target confirmable state, the process proceeds to step S110.

Furthermore, in a case where Yesk determination has been made in step S108, that is, in a case where the tracking target has been detected in the search processing according to the search route, the process proceeds to step S110.

In these cases, the mobile device (robot) 100 executes tracking target tracking processing in step S110.

This tracking processing is normal tracking processing based on detection information of the camera 101 and the distance sensor 102. That is, for example, the tracking processing is processing that follows a tracking target imaged in a captured image by the camera 101.

(Step S111)

Finally, in step S111, the mobile device (robot) 100 determines whether or not to end the tracking processing.

For example, the determination is made on the basis of a rule defined in advance such that tracking is ended in a case where a tracking target is out of a tracking range defined in advance, and the like.

In a case where it is determined in step S111 that the tracking processing is not to be ended, the process returns to step S101, and the processing in and after step S101 is repeated.

On the other hand, in a case where it is determined in step S111 that the tracking processing is to be ended, the processing ends.

By executing the processing according to the present flow, even in a case where a tracking target is lost, that is, lost sight, the mobile device (robot) according to the present disclosure can efficiently perform search processing of the tracking target, rediscover the tracking target in a short time, and continue the tracking processing.

4. Processing Examples According to Various Branch Configurations

Next, processing examples corresponding to various branch configurations will be described.

In the above-described embodiment, a processing example in a case where the tracking target is lost, that is, lost sight, in the T-junction as illustrated in FIG. 1 has been described. However, there are various configurations of a route in which a tracking target can be lost, that is, lost sight.

The mobile device (robot) of the present disclosure can quickly rediscover a tracking target in a case where the tracking target is lost not only in a specific route configuration but also in any route configuration.

Hereinafter, processing examples corresponding to a plurality of different route configurations will be described.

Figure 18:
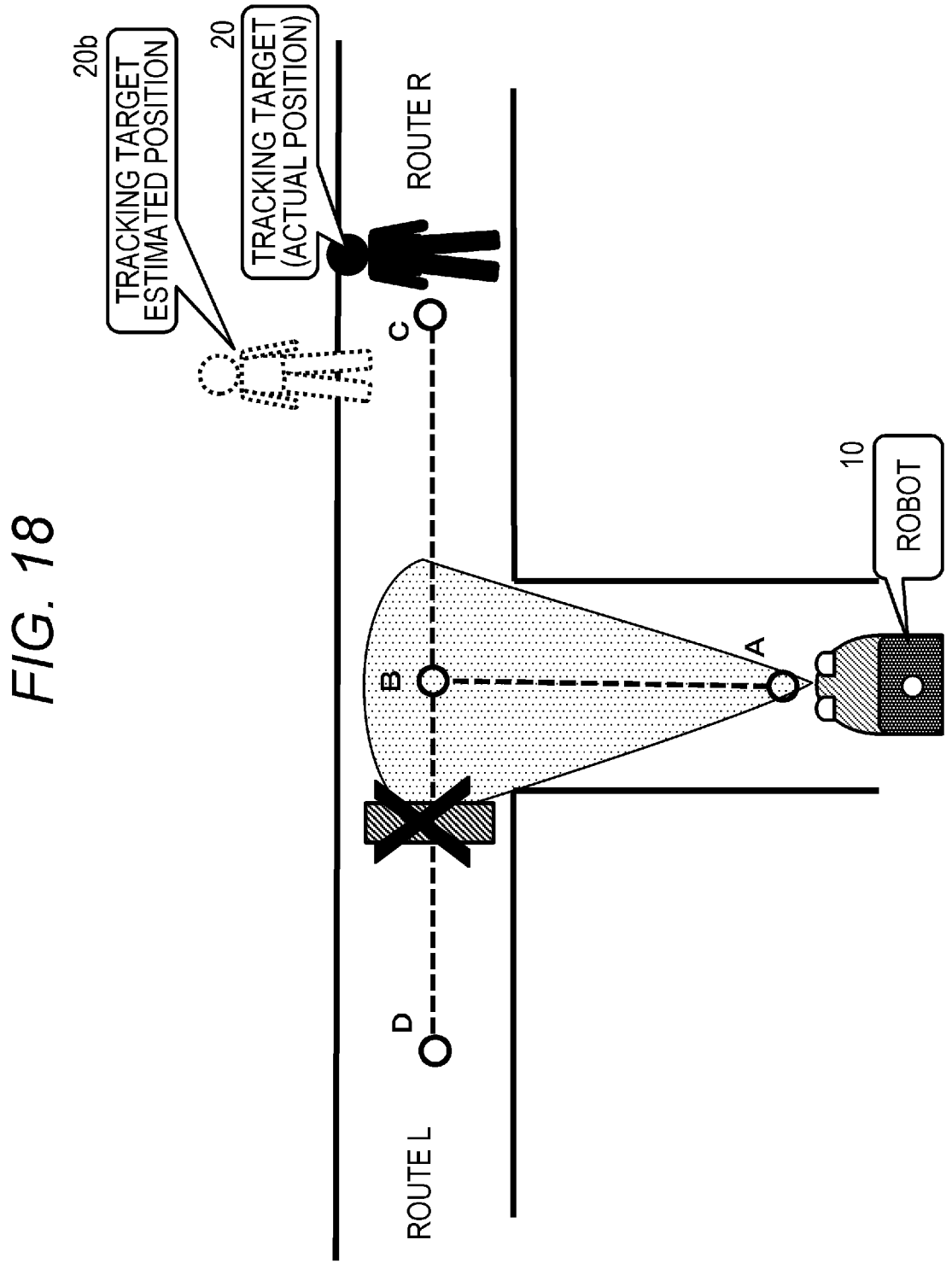
FIG. 18 is a diagram for describing a specific example of processing according to various branch configurations.

FIG. 18 illustrates a T-junction similar to that illustrated in FIG. 1, and a route B-D is set to be impassable due to an obstacle.

In such a case, the robot 10 sets only one search route of A-B-D as a search route and executes search processing.

That is, the route B-D constituting the search route A-B-D is an impassable route, it can be determined that there is no possibility that a tracking target enters, and the route B-D is excluded from a search target.

Note that, even in a case where the obstacle between B and D is not described in the map information, the presence of the obstacle can be detected by the camera or the 101 distance sensor of the robot 10, and processing that deletes the route of A-B-D from the search route can be performed in this obstacle detection stage.

Figure 19:
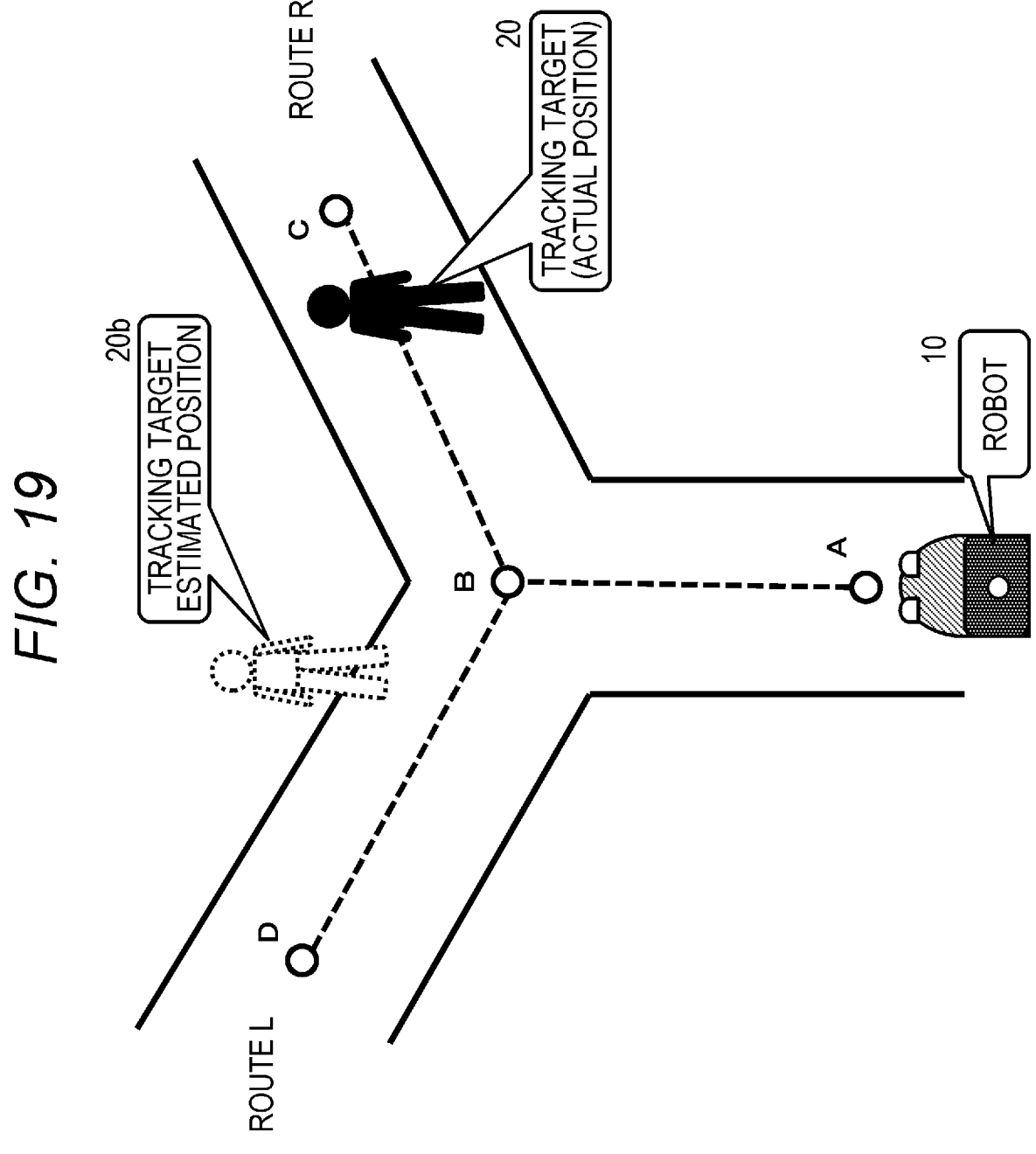
FIG. 19 is a diagram for describing a specific example of processing according to various branch configurations.

FIG. 19 illustrates a configuration of a Y-junction.

Furthermore, the tracking target 20 exists in a route R direction, and the tracking target estimated position 20b estimated by the robot 10 is set on a route L side as illustrated in the drawing.

In this case, a search route list generated by the robot 10 is generated as a list in the following order.

(Search route 1) A-B-D (Search route 2) A-B-C

The robot 10 first searches for the tracking target according to (Search route 1) A-B-D.

However, tracking target search processing according to this (Search route 1) A-B-D cannot detect the tracking target 20.

In this case, tracking target search processing according to the next (Search route 2) A-B-C is executed. In the tracking target search processing according to (Search route 2) A-B-C, the tracking target 20 can be detected.

In a case of this example, since the tracking target estimated position 20b is greatly different from an actual position of the tracking target 20, a time required for the tracking target detection becomes long. However, tracking processing can be finally continued by rediscovering the tracking target 20.

5. Configuration Examples of Mobile Device and Information Processing Device of the Present Disclosure Next, configuration examples of a mobile device and information processing device according to the present disclosure will be described.

The mobile device of the present disclosure includes not only the robot described in the above-described embodiment but also, for example, various mobile devices such as an automated vehicle, a drone, and the like.

Furthermore, calculation of a search route and drive control such as movement control, direction control, and the like of a mobile device (robot and the like) may be performed by a data processing unit of an information processing device provided inside the mobile device such as a robot and the like, or by an external information processing device capable of communicating with the robot.

Figure 20:
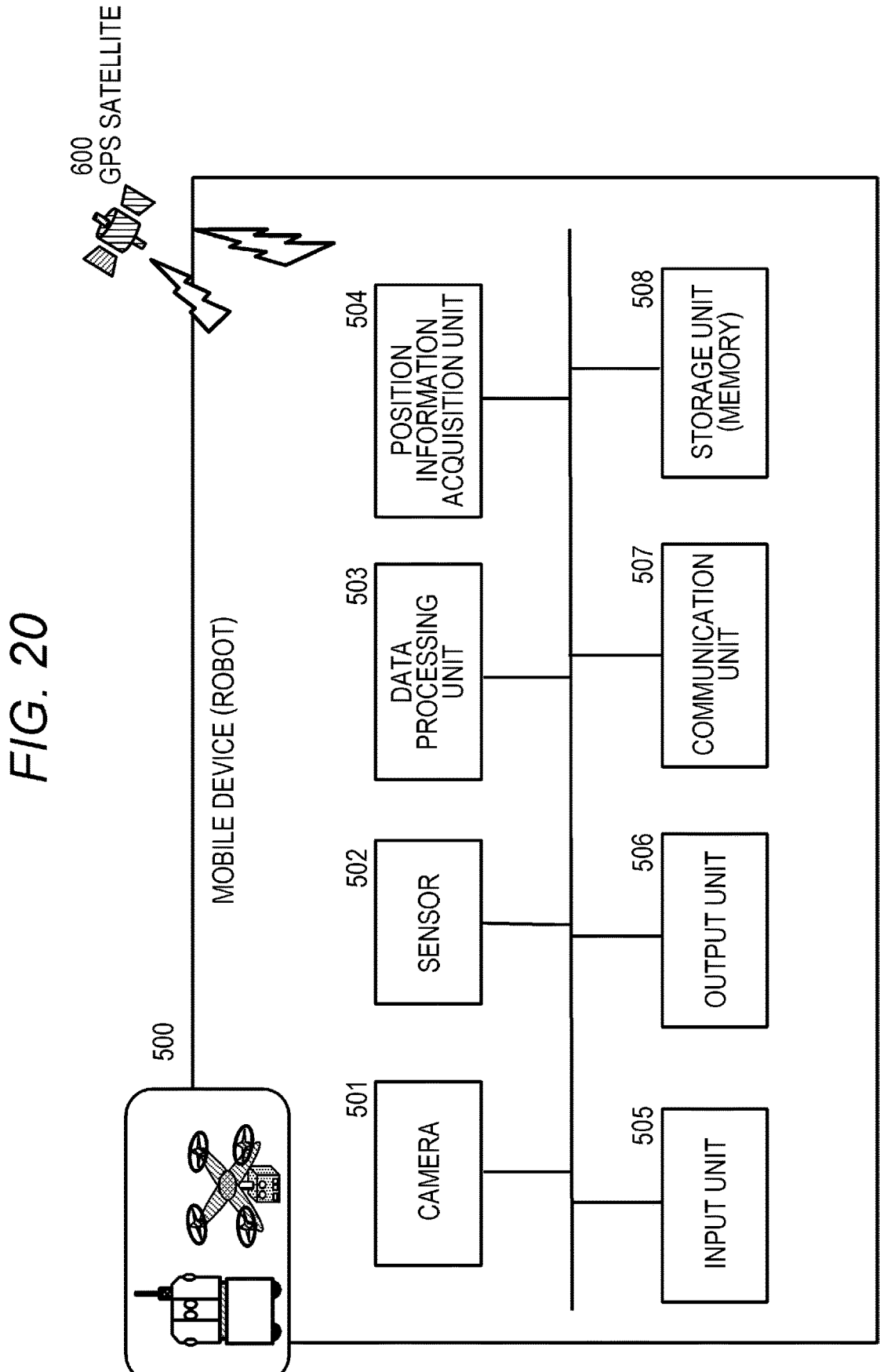
FIG. 20 is a diagram for describing a configuration example of a mobile device in a case where a search route is generated or robot control is performed by the mobile device alone.

FIG. 20 is a diagram illustrating a configuration example of a mobile device 500 in a case where a mobile device such as a robot alone performs calculation of a search route and drive control such as movement control, direction control, and the like of the mobile device (robot and the like). That is, it is a diagram illustrating a configuration example of the mobile device 500 in a case where an information processing device provided inside the mobile device performs calculation of a search route and drive control such as movement control, direction control, and the like of the mobile device (robot and the like).

Figure 21:
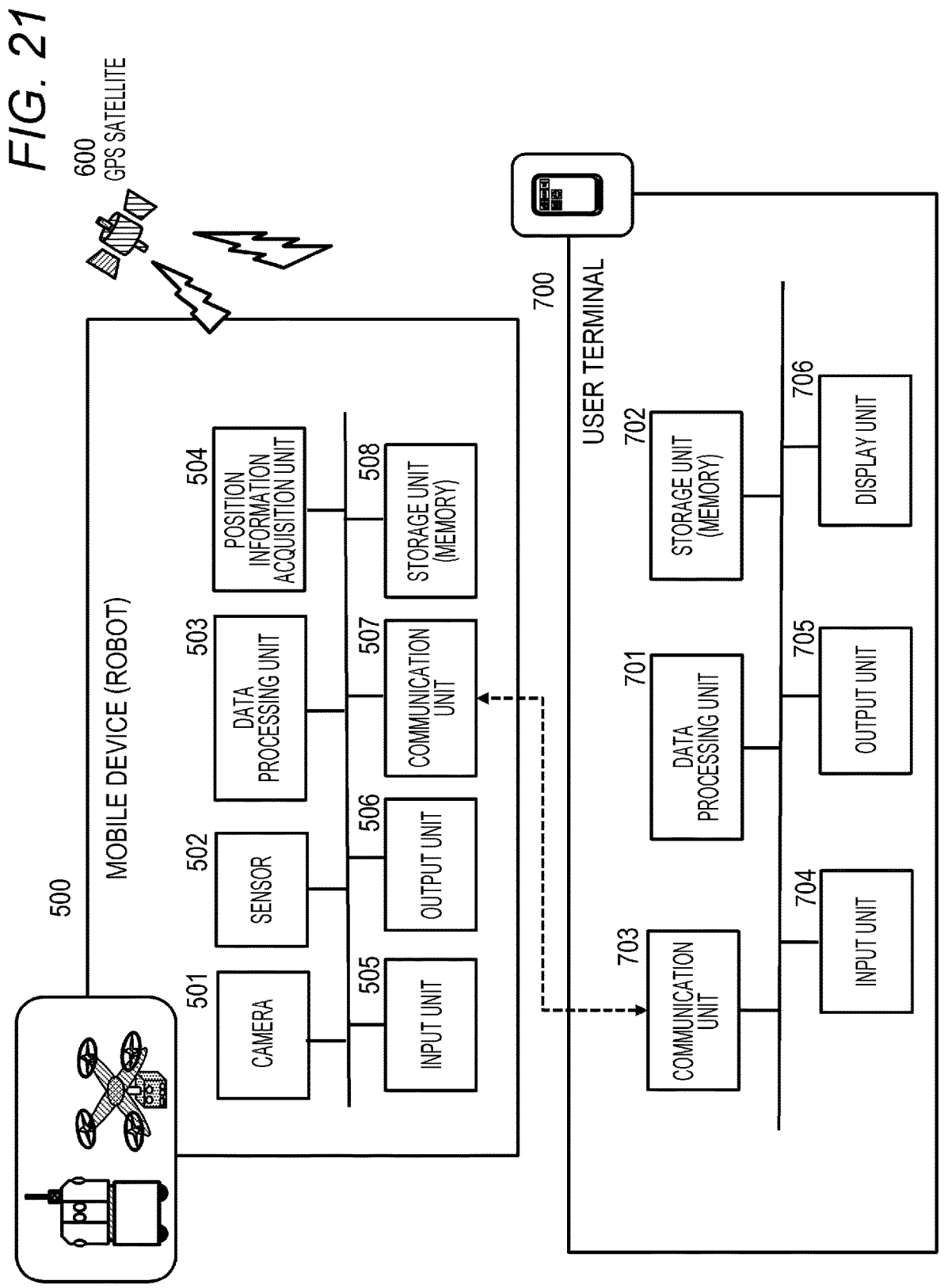
FIG. 21 is a diagram for describing a configuration example of the mobile device and a user terminal in a case where a search route is generated or robot control is performed by the user terminal capable of communicating with the mobile device.

FIG. 21 is a diagram illustrating a configuration example of the mobile device 500 and a user terminal 700 in a case where a user terminal capable of communicating with the mobile device, for example, a controller, a PC, or a smartphone performs calculation of a search route and drive control such as movement control, direction control, and the like of the mobile device (robot and the like).

First, the configuration example of the mobile device 500 in a case where the mobile device alone performs calculation of a search route and drive control such as movement control, direction control, and the like of the mobile device (robot and the like) will be described with reference to FIG. 20.

As illustrated in FIG. 20, the mobile device 500 includes a camera 501, a sensor 502, a data processing unit 503, a position information acquisition unit 504, an input unit 505, an output unit 506, a communication unit 507, and a storage unit (memory) 508.

The camera 501 captures an image in a traveling direction of the mobile device 500 and an image of a tracking target.

The sensor 502 is, for example, an object detection sensor including light detection and ranging or laser imaging detection and ranging (LiDAR) and the like. A distance and the like to a tracking target or an obstacle is measured. Note that the sensor 502 is not limited to the LiDAR, and may be, for example, a stereo camera, a ToF sensor, an ultrasonic sensor, a radar, a sonar, and the like.

The data processing unit 503 executes processing according to the above-described embodiment, that is, calculation of a search route and drive control processing such as movement control, direction control, and the like of a mobile device (robot and the like), and the like.

The self-position estimation unit 103, the tracking target position estimation unit 104, the tracking target search unit 105, the robot drive information generation unit 107, and the like, which are the main configuration of the mobile device (robot) 100 described above with reference to FIG. 7, are included in the data processing unit 503.

Note that the data processing unit 503 includes, for example, a processor such as a CPU and the like having a program execution function, and executes processing and the like according to the flowchart described in the above-described embodiment.

The program is stored in the storage unit 508.

For example, the position information acquisition unit 504 executes communication with a GPS satellite 600, analyzes a current position (latitude, longitude, height) of the mobile device 500 on the basis of communication information with the GPS satellite 600, and outputs analysis information to the data processing unit 503.

The input unit 505 is, for example, an operation unit by a user, and is used for various processing, for example, input processing of a user request such as start and stop of traveling, and the like.

The output unit 506 includes a sound output unit, an image output unit, and the like.

The communication unit 507 executes communication with a user terminal or an external server.

The storage unit (memory) 508 is used as a storage area and a work area of a program executed by the data processing unit 503. It is also used as a storage area for various parameters applied to processing. The storage unit (memory) 106 includes a RAM, a ROM, and the like.

Next, configurations of the mobile device 500 and the user terminal 700 in a case where a user terminal capable of communicating with the mobile device, for example, a controller, a PC, or a smartphone performs calculation of a search route and drive control such as movement control, direction control, and the like of the mobile device (robot and the like) will be described with reference to FIG. 21.

The mobile device 500 has a configuration similar to the configuration described with reference to FIG. 21.

It communicates with the user terminal 700 via the communication unit 507.

The configuration of the user terminal 700 will be described. As illustrated in the drawing, the user terminal 700 includes a data processing unit 701, a storage unit (memory) 702, a communication unit 703, an input unit 704, an output unit 705, and a display unit 706.

The data processing 701 executes calculation of a search route of the mobile device 500 or drive control processing such as movement control, direction control, and the like of the mobile device (robot and the like), and the like.

The processing executed by the self-position estimation unit 103, the tracking target position estimation unit 104, the tracking target search unit 105, the robot drive information generation unit 107, and the like, which are the main configuration of the mobile device (robot) 100 described above with reference to FIG. 7, is executed in the data processing unit 701.

The data processing unit 701 of the user terminal 700 generates search route information and drive control information such as movement control, direction control, and the like of the mobile device (robot and the like), and transmits the information to the mobile device 500 via the communication unit 703.

The mobile device 500 moves according to the control information received from the user terminal 700. Note that the data processing unit 701 includes, for example, a processor such as a CPU and the like having a program execution function, and executes processing and the like according to the flowchart described in the above-described embodiment.

The program is stored in the storage unit 702.

The storage unit (memory) 702 is used as a storage area and a work area of a program executed by the data processing unit 701. It is also used as a storage area for various parameters applied to processing. The storage unit (memory) 204 includes a RAM, a ROM, and the like.

The communication unit 703 executes communication with the mobile device 500 or an external server.

The input unit 704 is an operation unit by a user, and is used for various processing, for example, input processing of a user request such as start and end of control of the mobile device 500, and the like.

The output unit 705 includes a sound output unit, an image output unit, and the like.

The display unit 706 is used to display a camera-captured image and the like of the mobile device 500, display a map stored in the storage unit 702, and display route information and the like generated by the data processing unit 701.

In an information processing system using the mobile device 500 and the user terminal 700 as illustrated in FIG. 21, for example, the following processing can be performed.

The data processing unit of the user terminal 700 calculates a tracking target estimated position that is an estimated position of a tracking target to be followed by the mobile device 500. Moreover, the data processing unit generates a search route list, and selects a search route in order from the top of the search route list.

The mobile device 500 moves according to the search route selected by the user terminal 700 and searches for the tracking target.

Moreover, when the mobile device 500 moves according to the search route selected by the user terminal 700 and searches for the tracking target, the mobile device 500 inputs an image captured by the camera mounted on the mobile device 500 and transmits the captured image to the user terminal 700.

The user terminal 700 determines whether or not the tracking target has been detected on the basis of the captured image received from the mobile device 500.

Using this determination result, the mobile device 400 is caused to resume the tracking processing or perform search processing according to the next search route.

For example, such processing becomes possible.

6. Summary of Configurations of the Present Disclosure

The embodiment of the present disclosure has been described above in detail with reference to the specific embodiment. However, it is self-evident that a person skilled in the art can modify or substitute the embodiment without departing from the gist of the present disclosure. That is, the present invention has been disclosed in the form of exemplification, and should not be interpreted in a limited manner. The scope of the claims should be considered in order to determine the gist of the present disclosure.

Note that the technology disclosed in the present specification can have the following configurations.

(1) An information processing device including: a tracking target position estimation unit that calculates a tracking target estimated position that is an estimated position of a tracking target to be tracked by a mobile device; and a tracking target search unit that searches for the tracking target, in which the tracking target search unit calculates one or more search routes connecting a current position of the mobile device and a position where the tracking target can exist, generates a search route list in which the calculated one or more search routes are arranged from the top in order of proximity to the tracking target estimated position, and selects a search route in order from the top of the generated search route list, and moves the mobile device according to the selected search route to search for the tracking target.

(2) The information processing device according to (1), in which when moving the mobile device according to the selected search route to search for the tracking target, the tracking target search unit determines whether or not the tracking target has been detected by inputting an image captured by a camera mounted on the mobile device.

(3) The information processing device according to (1) or (2), in which the tracking target position estimation unit calculates the tracking target estimated position by inputting a captured image that is a past image captured by a camera mounted on the mobile device and in which the tracking target is captured.

(4) The information processing device according to any one of (1) to (3), in which the tracking target position estimation unit calculates the tracking target estimated position by applying a motion model corresponding to a type of the tracking target.

(5) The information processing device according to any one of (1) to (4), in which the tracking target search unit calculates the one or more search routes connecting the position where the tracking target can exist by inputting the current position of the mobile device estimated by a self-position estimation unit.

(6) The information processing device according to (5), in which the self-position estimation unit calculates the current position of the mobile device by simultaneous localization and mapping (SLAM) processing.

(7) The information processing device according to any one of (1) to (6), in which the mobile device includes a sensor that detects the tracking target, and the tracking target search unit executes processing that searches for the tracking target in a case where the tracking target is not detected by the sensor.

(8) The information processing device according to (7), in which the sensor includes a camera.

(9) The information processing device according to any one of (1) to (8), in which the information processing device includes a sensor that detects the tracking target, and in a first state in which the tracking target is detected by the sensor, tracking processing of the tracking target is executed according to detection information of the sensor, and in a second state in which a period during which the tracking target is not detected by the sensor has occurred for a prescribed time (t1), or in a third state in which the second state has continuously occurred for a prescribed time (t2), the tracking target search unit executes processing that searches for the tracking target.

(10) The information processing device according to any one of (1) to (9), in which the tracking target search unit calculates the one or more search routes connecting the current position of the mobile device and the position where the tracking target can exist with reference to map information.

(11) The information processing device according to any one of (1) to (10), in which the information processing device is an information processing device provided in the mobile device.

(12) The information processing device according to any one of (1) to (10), in which the information processing device is an information processing device capable of communicating with the mobile device.

(13) An information processing system including: a mobile device; and an information processing device capable of communicating with the mobile device, in which the information processing device includes a tracking target position estimation unit that calculates a tracking target estimated position that is an estimated position of a tracking target to be tracked by the mobile device, and a tracking target search unit that searches for the tracking target, and the tracking target search unit calculates one or more search routes connecting a current position of the mobile device and a position where the tracking target can exist, generates a search route list in which the calculated one or more search routes are arranged from the top in order of proximity to the tracking target estimated position, and selects a search route in order from the top of the generated search route list, and the mobile device moves according to the search route selected by the information processing device to search for the tracking target.

(14) The information processing system according to (13), in which when moving according to the search route selected by the information processing device to search for the tracking target, the mobile device inputs an image captured by a camera mounted on the mobile device and transmits the captured image to the information processing device, and the information processing device determines whether or not the tracking target has been detected on the basis of the captured image received from the mobile device.

(15) An information processing method executed in an information processing device, the information processing method including: a tracking target position estimation step of calculating, by a tracking target position estimation unit, a tracking target estimated position that is an estimated position of a tracking target to be tracked by a mobile device; and a step, by a tracking target search unit, of calculating one or more search routes connecting a current position of the mobile device and a position where the tracking target can exist, generating a search route list in which the calculated one or more search routes are arranged from the top in order of proximity to the tracking target estimated position, and selecting a search route in order from the top of the generated search route list, and moving the mobile device according to the selected search route to search for the tracking target.

(16) An information processing method executed in an information processing system including a mobile device and an information processing device capable of communicating with the mobile device, the information processing method including:

executing, by the information processing device, tracking target position estimation processing that calculates a tracking target estimated position that is an estimated position of a tracking target to be tracked by the mobile device; and processing that calculates one or more search routes connecting a current position of the mobile device and a position where the tracking target can exist, generates a search route list in which the calculated one or more search routes are arranged from the top in order of proximity to the tracking target estimated position, and selects a search route in order from the top of the generated search route list, and by the mobile device, moving according to the search route selected by the information processing device to search for the tracking target.

(17) A program for causing an information processing device to execute information processing, the program including: a tracking target position estimation step of causing a tracking target position estimation unit to calculate a tracking target estimated position that is an estimated position of a tracking target to be tracked by a mobile device, and causing a tracking target search unit to calculate one or more search routes connecting a current position of the mobile device and a position where the tracking target can exist, generate a search route list in which the calculated one or more search routes are arranged from the top in order of proximity to the tracking target estimated position, and select a search route in order from the top of the generated search route list, and move the mobile device according to the selected search route to search for the tracking target.

Furthermore, the series of processing described in the specification can be executed by hardware, software, or a combined configuration of both. In a case where processing by software is executed, a program in which a processing sequence is recorded can be installed and executed in a memory in a computer incorporated in dedicated hardware, or the program can be installed and executed in a general-purpose computer capable of executing various types of processing. For example, the program can be recorded in advance in a recording medium. In addition to installation from the recording medium to the computer, the program can be received via a network such as a local area network (LAN) or the Internet and installed in a recording medium such as a built-in hard disk and the like.

Note that the various types of processing described in the specification may be executed not only in time series according to the description but also in parallel or individually according to processing capability of the device that executes the processing or as necessary. Furthermore, in the present specification, a system is a logical set configuration of a plurality of devices, and is not limited to a system in which devices of configurations are in the same housing.

INDUSTRIAL APPLICABILITY

As described above, according to the configuration of one embodiment of the present disclosure, it is possible to implement a device and a method capable of efficiently rediscovering a tracking target and restarting tracking in a case where the tracking target to be tracked by a mobile device is lost.

Specifically, for example, a tracking target position estimation unit and a tracking target search unit that searches for a tracking target are included. The tracking target search unit calculates one or more search routes connecting a current position of the mobile device and a position where the tracking target can exist, generates a search route list in which the calculated one or more search routes are arranged from the top in order of proximity to a tracking target estimated position, and selects a search route in order from the top of the generated search route list, and moves the mobile device according to the selected search route to search for the tracking target. It is determined whether or not the tracking target has been detected on the basis of an image captured by a camera mounted on the mobile device, and in a case where the tracking target has been detected, tracking processing is resumed.

According to this configuration, the device and the method are implemented that enable efficient rediscovery of the tracking target and restart of tracking in a case where the tracking target to be tracked by the mobile device is lost.

REFERENCE SIGNS LIST

10 Robot
20 Tracking target
100 Mobile device (robot)
101 Camera
102 Distance sensor
103 Self-position estimation unit
104 Tracking target position estimation unit
105 Tracking target search unit
106 Map data storage unit
107 Robot drive information generation unit
108 Robot drive unit
121 Tracking target region detection unit
122 Tracking target three-dimensional position estimation unit
131 In-image tracking target three-dimensional position calculation unit
132 Motion model application tracking target three-dimensional position estimation unit
151 Search route analysis unit
152 Search route determination unit
153 Tracking target detection confirmation unit
500 Mobile device
501 Camera
502 Sensor
503 Data processing unit
504 Position information acquisition unit
505 Input unit
506 Output unit
507 Communication unit
508 Storage unit (memory)
600 GPS satellite
700 User terminal
701 Data processing unit
702 Storage unit (memory)
703 Communication unit
704 Input unit
705 Output unit
706 Display unit

The invention claimed is:

1. An information processing device comprising:
processing circuitry configured to:
calculate a tracking target estimated position that is an estimated position of a tracking target to be tracked by a mobile device; and
search for the tracking target, including:
calculating a plurality of search routes connecting a current position of the mobile device and a position where the tracking target can exist, generating a search route list in which the calculated plurality of search routes are arranged from a top in order of proximity to the tracking target estimated position,
selecting a search route in order sequentially from the top of the generated search route list, moving the mobile device according to the selected search route to search for the tracking target, and
in response to not detecting the tracking target along the selected search route,
selecting a next search route in the order from the search route list, and
moving the mobile device according to the next selected search route to search for the tracking target.

2. The information processing device according to claim 1, wherein
when moving the mobile device according to the selected search route to search for the tracking target, the processing circuitry is configured to determine whether or not the tracking target has been detected by inputting an image captured by a camera mounted on the mobile device.

3. The information processing device according to claim 1, wherein the processing circuitry is configured to calculate the tracking target estimated position by inputting a captured image that is a past image captured by a camera mounted on the mobile device and in which the tracking target is captured.

4. The information processing device according to claim 1, wherein the processing circuitry is configured to calculate the tracking target estimated position by applying a motion model corresponding to a type of the tracking target.

5. The information processing device according to claim 1, wherein the current position of the mobile device is estimated by the mobile device.

6. The information processing device according to claim 5, wherein the processing circuitry is configured to calculate the current position of the mobile device by simultaneous localization and mapping (SLAM) processing.

7. The information processing device according to claim 1, wherein
the mobile device includes a sensor configured to detect the tracking target, and
the processing circuitry is configured to execute the search for the tracking target in a case where the tracking target is not detected by the sensor.

8. The information processing device according to claim 7, wherein the sensor includes a camera.

9. The information processing device according to claim 1, wherein
the information processing device includes a sensor configured to detect the tracking target,
in a first state in which the tracking target is detected by the sensor, tracking processing of the tracking target is executed according to detection information of the sensor, and
in a second state in which a period during which the tracking target is not detected by the sensor has occurred for a first prescribed time or in a third state in which the second state has continuously occurred for a second prescribed time, the processing circuitry is configured to execute the search for the tracking target.

10. The information processing device according to claim 1, wherein the processing circuitry is configured to calculate the one or more search routes connecting the current position of the mobile device and the position where the tracking target can exist with reference to map information.

11. The information processing device according to claim 1, wherein the information processing device is provided in the mobile device.

12. The information processing device according to claim 1, wherein the information processing device is capable of communicating with the mobile device.

13. An information processing system comprising:
a mobile device; and
an information processing device capable of communicating with the mobile device, wherein
the information processing device includes processing circuitry configured to:
calculate a tracking target estimated position that is an estimated position of a tracking target to be tracked by the mobile device, and search for the tracking target, including:

calculating a plurality of search routes connecting a current position of the mobile device and a position where the tracking target can exist, generating a search route list in which the calculated plurality of search routes are arranged from a top in order of proximity to the tracking target estimated position, and selecting a search route in order sequentially from the top of the generated search route list, the mobile device is configured to move according to the search route selected by the information processing device to search for the tracking target, and in response to not detecting the tracking target along the selected search route, the processing circuitry selects a next search route in the order from the search route list, and the mobile device moves according to the next selected search route to search for the tracking target.

14. The information processing system according to claim 13, wherein when moving according to the search route selected by the information processing device to search for the tracking target:

the mobile device is configured to input an image captured by a camera mounted on the mobile device and transmit the captured image to the information processing device, and the processing circuitry is configured to determine whether or not the tracking target has been detected on a basis of the captured image received from the mobile device.

15. An information processing method executed in an information processing device, the method comprising: calculating a tracking target estimated position that is an estimated position of a tracking target to be tracked by a mobile device; and searching for the tracking target, including: calculating a plurality of search routes connecting a current position of the mobile device and a position where the tracking target can exist, generating a search route list in which the calculated plurality of search routes are arranged from a top in order of proximity to the tracking target estimated position, selecting a search route in order sequentially from the top of the generated search route list, moving the mobile device according to the selected search route to search for the tracking target, and in response to not detecting the tracking target along the selected search route, selecting a next search route in the order from the search route list, and moving the mobile device according to the next selected search route to search for the tracking target.

16. An information processing method executed in an information processing system including a mobile device and an information processing device capable of communicating with the mobile device, the method comprising:

by the information processing device:

calculating a tracking target estimated position that is an estimated position of a tracking target to be tracked by the mobile device, calculating a plurality of search routes connecting a current position of the mobile device and a position where the tracking target can exist, generating a search route list in which the calculated plurality of search routes are arranged from a top in order of proximity to the tracking target estimated position, and selecting a search route in order sequentially from the top of the generated search route list;

by the mobile device, moving according to the search route selected by the information processing device to search for the tracking target: and in response to not detecting the tracking target along the selected search route by the information processing device, selecting a next search route in the order from the search route list, and by the mobile device, moving according to the next selected search route to search for the tracking target.

17. A non-transitory computer readable mediums medium storing a program for causing an information processing device to execute an information processing method, the method comprising:

calculating a tracking target estimated position that is an estimated position of a tracking target to be tracked by a mobile device, calculating a plurality of search routes connecting a current position of the mobile device and a position where the tracking target can exist, generating a search route list in which the calculated plurality of search routes are arranged from a top in order of proximity to the tracking target estimated position, selecting a search route in order sequentially from the top of the generated search route list, moving the mobile device according to the selected search route to search for the tracking target, and in response to not detecting the tracking target along the selected search route, selecting a next search route in the order from the search route list, and moving the mobile device according to the next selected search route to search for the tracking target.

* * * * *